(12) United States Patent
Du

(10) Patent No.: US 12,548,865 B2
(45) Date of Patent: Feb. 10, 2026

(54) UNIVERSAL TUBULAR SOLID OXIDE FUEL CELL TESTING DEVICE

(71) Applicant: Yanhai Du, Hudson, OH (US)

(72) Inventor: Yanhai Du, Hudson, OH (US)

(73) Assignee: Kent State University, Kent, OH (US)

(*) Notice: Subject to any disclaimer, the term of this patent is extended or adjusted under 35 U.S.C. 154(b) by 1008 days.

(21) Appl. No.: 17/677,077

(22) Filed: Feb. 22, 2022

(65) Prior Publication Data
US 2022/0181653 A1 Jun. 9, 2022

Related U.S. Application Data

(63) Continuation of application No. 16/633,114, filed as application No. PCT/US2017/043668 on Jul. 25, 2017, now Pat. No. 11,296,342.

(51) Int. Cl.
*H01M 8/0252* (2016.01)
*H01M 8/0432* (2016.01)
(Continued)

(52) U.S. Cl.
CPC ..... *H01M 8/0432* (2013.01); *H01M 8/04537* (2013.01); *H01M 8/04664* (2013.01);
(Continued)

(58) Field of Classification Search
CPC ........... H01M 8/0252; H01M 50/0569; H01M 2008/1293; H01M 8/2425; H01M 8/12; H01M 8/1213; H01M 8/1226; H01M 8/1231; H01M 8/124–1266; H01M 4/9025; H01M 4/9033; H01M 4/905;
(Continued)

(56) References Cited

U.S. PATENT DOCUMENTS

| 3,423,243 A | * | 1/1969 | Yeager | H01M 8/0252 |
| | | | | 429/517 |
| 3,522,097 A | * | 7/1970 | Tedmon, Jr. | H01M 8/0232 |
| | | | | 429/522 |

(Continued)

OTHER PUBLICATIONS

Jiang (Jiang et al.; "Effect of contact between electrode and current collector on the performance of solid oxide fuel cells"; Solid State Ionics vol. 160, Issues 1-2, May 2003, pp. 15-26) (Year: 2003).*
US ISA, International Search Report and Written Opinion for International Application No. PCT/US2017/043668, dated Dec. 20, 2017, 10 pgs.

*Primary Examiner* — Jeremiah R Smith
(74) *Attorney, Agent, or Firm* — RENNER KENNER GREIVE BOBAK TAYLOR & WEBER

(57) ABSTRACT

A testing device for tubular solid oxide fuel cells (SOFC) includes a housing within which the tubular SOFC is mounted. The housing includes suitable inlets and outlets to allow a fuel gas, such as hydrogen, and an oxidant, such as air or oxygen, to interact with the anode and cathode of the tubular SOFC. In addition, the housing is formed of suitable material for placement in a heating device, such as a tubular furnace or a miniature tubular heater. A temperature sensor and computing device may monitor the temperature of the tubular SOFC in order to control the operation of the tubular heating device. In addition, the device provides electrical current collectors for coupling to the anode and cathode of the SOFC, which may be removable and reusable.

8 Claims, 10 Drawing Sheets

(51) Int. Cl.
  *H01M 8/04537*  (2016.01)
  *H01M 8/04664*  (2016.01)
  *H01M 8/04701*  (2016.01)
  *H01M 8/12*  (2016.01)
  *H01M 8/04746*  (2016.01)

(52) U.S. Cl.
  CPC ......... *H01M 8/04701* (2013.01); *H01M 8/12* (2013.01); *H01M 8/04753* (2013.01); *H01M 2008/1293* (2013.01)

(58) Field of Classification Search
  CPC ............. H01M 4/9058; H01M 4/9066; H01M 4/8803; H01M 4/88
  See application file for complete search history.

(56) References Cited

U.S. PATENT DOCUMENTS

| | | | |
|---|---|---|---|
| 2003/0148160 A1 | 8/2003 | Song et al. | |
| 2008/0241605 A1* | 10/2008 | Crumm ............... | H01M 8/0232 429/406 |
| 2008/0286633 A1 | 11/2008 | Olenick et al. | |
| 2009/0148741 A1* | 6/2009 | Imanishi ............. | H01M 8/2418 429/523 |
| 2011/0076597 A1* | 3/2011 | Sutton ................. | H01M 8/1231 429/535 |
| 2013/0089810 A1* | 4/2013 | Hiraiwa .............. | H01M 8/0252 204/252 |
| 2013/0230791 A1* | 9/2013 | Chang ................. | H01M 8/0232 429/495 |
| 2013/0316266 A1 | 11/2013 | Shimazu et al. | |

\* cited by examiner

UNIVERSAL TUBULAR SOLID OXIDE FUEL CELL TESTING DEVICE

TECHNICAL FIELD

The embodiments disclosed herein relate to fuel cells. Particularly, the embodiments disclosed herein relate to testing devices for evaluating fuel cells. More particularly, the embodiments disclosed herein relate to a universal testing device for evaluating tubular solid oxide fuel cells.

BACKGROUND

Fuel cells, due to their energy conversion efficiencies of around 60-90% have attracted interest in all areas of technological research, development and deployment, and have the potential to meet the ever-increasing energy demands of the global market. Solid oxide fuel cells, hereinafter referred to as SOFC(s), can directly operate on hydrogen as well as syngas. A syngas is a mixture of hydrogen and carbon monoxide that can be a product from catalytically reformed hydrocarbon fuels, such as natural gas or coal-gas. SOFCs are reliant on many technical disciplines, including chemical engineering principles, such as electrochemical principles, solid-state chemistry, material science, in addition to advanced mechanical and thermal design principles. Because of the diverse technologies employed by SOFCs, it is challenging for new developers desiring to enter the SOFC industry, especially those developers that have technical competencies in only a limited number of areas that SOFCs encompass. In order to allow such developers to meaningfully explore the operational behavior of SOFCs, and the manner in which design choices impact their performance, there exists a great need for improved testing capabilities for SOFCs.

While efforts have been made in establishing robust testing capabilities for SOFCs beyond basic materials research, such efforts have provided limited value to new developers entering the SOFC technology space. For example, current SOFC testing protocols, including those that utilize "button cell test setups", are not only very expensive, but they generally fail to provide real-life testing conditions for testing an operable SOFC. Furthermore, these "button cell test setups" yield results that are typically not reproducible in large scale cells, and therefore cannot be reliability used by developers in guiding further study or advances of SOFC technologies. Moreover, button cell test setups and current tubular SOFC test setups used by researchers and developers have to use glass seals or ceramic seals. Tested SOFCs after these glass/ceramic seals could not be retested or used in stacks because of the destructive glass/ceramic seals often alter the SOFCs. Finally, while the ad-hoc SOFC testing devices discussed above have been utilized that are no commercial SOFC testing devices that are available to SOFC developers.

Additionally, given the technological complexities of SOFCs, along with the difficulties and expense associated with current SOFC testing protocols, many researchers have elected to abandon the study of materials as they pertain to SOFCs, and have limited their research to the general evaluation of the properties of these materials, without regard to their application to SOFCs. This, and other factors in the SOFC industry, has led to fragmented development efforts across the industry, which are exemplified in the development of multiple SOFC design platforms, whereby unit cells of the various SOFC platforms exhibit a diverse cross-sectional geometry. Such fragmented development has also prevented a profitable and sustainable business model from emerging for the successful commercialization of SOFC technology. Another concern plaguing the SOFC industry is its inability to align the development efforts of its member developers, as exhibited by the industry's failure to transition from materials research for single SOFC cells to that for SOFC stack designs for use in down-stream development. As previously discussed, a substantial contributor to the difficulties suffered by the SOFC industry is that new developers are required to purchase costly testing equipment, which is not only unreliable, but is unable to collect robust and repeatable testing data that can be used to advance SOFC design efforts. Such barriers to entry make it unattractive for developers to apply their particular technical capabilities to SOFC technologies, and to undertake the efforts needed to make the transition from materials development in general, to the development of materials suitable for SOFCs, as well as the design of single cell SOFCs and SOFC stacks.

Therefore, there is a need for a testing device for tubular SOFCs and methods thereof that can be utilized for testing new materials, operating conditions and fuel reformation methods for use in advancing SOFC technology. There is also a need for a tubular SOFC testing device that can be utilized in the development of solutions for facilitating stacking capabilities of individual tubular SOFC unit cells. In addition, there is a need for a tubular SOFC testing device that provides a low-cost, reliable testing solution for tubular SOFCs, which supports new methods of manufacturing tubular SOFCs. In addition, there is a need for a tubular SOFC testing device that is affordable, reliable, and easy to use for new and existing tubular SOFC developers, as well as those developers entering the tubular SOFC industry that have limited technical capabilities pertaining to tubular SOFC development, testing and deployment. Furthermore, these tubular SOFCs and components (e.g., anode only, anode with electrolyte, or cathode with electrolyte) can be by researchers and developers to establish performance comparison bases of new materials in a quick timeframe (i.e., quick turnaround).

SUMMARY

In light of the foregoing, it is a first aspect of the present invention to provide a device for testing a tubular solid-oxide fuel cell (SOFC) that has an outer electrode and a central cavity that is defined by a central electrode, the device comprising a tubular housing defining a housing cavity therein that is in fluid communication with a first opening and a second opening that are disposed at respective ends of the tubular housing, the housing including an inlet aperture and an outlet aperture disposed through the housing, and in fluid communication with the housing cavity; a first cap configured to be attached to one end of the housing, the first cap having an inlet port; a second cap configured to be attached to another end of the housing, the second cap having an outlet port; wherein the housing cavity is configured to receive the tubular SOFC so that the inlet port and the outlet port are in fluid communication with the central cavity of the tubular SOFC, and wherein the inlet aperture and the outlet aperture are in fluid communication with a gap formed in the housing cavity that is between the outer electrode of the tubular SOFC and the tubular housing.

It is yet another aspect of the present invention to provide a device for testing a tubular solid-oxide fuel cell (SOFC) having an outer electrode and a central cavity that is defined by a central electrode, the device comprising a first fixture having an inlet tube having a first interface at one end; and a second fixture having an outlet tube having a second interface at one end, wherein at least one of the fixtures is moveable; wherein the first interface of the inlet tube is configured to be placed in fluid communication with the central cavity of the tubular SOFC, and the second interface of the outlet tube is configured to be placed in fluid communication with the central cavity of the tubular SOFC, such that the first and second interfaces are spaced apart and the outer electrode of the tubular SOFC is left exposed to an external environment.

Yet another aspect of the present invention is a device for testing a tubular solid-oxide fuel cell (SOFC) having an outer electrode and a central cavity that is defined by a central electrode, the device comprising a tubular housing having a housing cavity to receive the SOFC therein; a first cap and a second cap configured to be attached to respective ends of the housing, each the cap including: a first port; a second port; wherein the first port of the first and second caps is configured to be placed in fluid communication with the central cavity of the SOFC, and the second port of the first and second caps is configured to be placed in fluid communication with a gap formed between the outer electrode of the SOFC and the housing.

Still another aspect of the present invention is to provide a testing device for a tubular solid-oxide fuel cell (SOFC) having an outer electrode and a central cavity that is defined by a central electrode, the central cavity having one open end and one closed end, the device comprising a heating tube defining an opening, and including a heater port that is disposed through a wall of the heating tube, with the opening and the heater port in fluid communication with an elongated heating cavity defined by the heating tube, wherein the opening is configured to receive the SOFC into the heating cavity to heat the SOFC, and wherein a first passage is formed between the SOFC and the heating tube, with the heater port being in fluid communication with the first passage; and a supply tube configured to be at least partially received within the central cavity of the SOFC to form a second passage between the supply tube and the SOFC.

It is yet another aspect of the present invention to provide a method of testing a tubular solid-oxide fuel cell (SOFC) having an outer electrode, and a central cavity that is defined by a central electrode, the central cavity having one open end and one closed end, the method comprising providing a heating tube having an elongated cavity therein; placing the SOFC in the cavity; and heating the SOFC.

Still another aspect of the present invention is to provide a current collector for a tubular solid-oxide fuel cell (SOFC) having an outer electrode and a central cavity that is defined by a central electrode, the current collector comprising an electrically conductive member; and a plurality of electrically conductive and flexible ribs electrically coupled to, and extending from, the supply tube, the ribs configured to be in electrical contact with the central electrode when the member is at least partially inserted into the central cavity.

Still another aspect of the present invention is to provide a current collector for a tubular solid-oxide fuel cell (SOFC) having an outer electrode and a central cavity that is defined by a central electrode, the current collector comprising an electrically conductive member; an electrically conductive mesh electrically coupled to the member; wherein the mesh is configured to be at least partially wrapped in electrical contact with the outer electrode of the SOFC.

BRIEF DESCRIPTION OF THE DRAWINGS

The various embodiments disclosed herein will become better understood with regard to the following description, accompanying drawings, and appended claims wherein:

DETAILED DESCRIPTION

Figure 1:
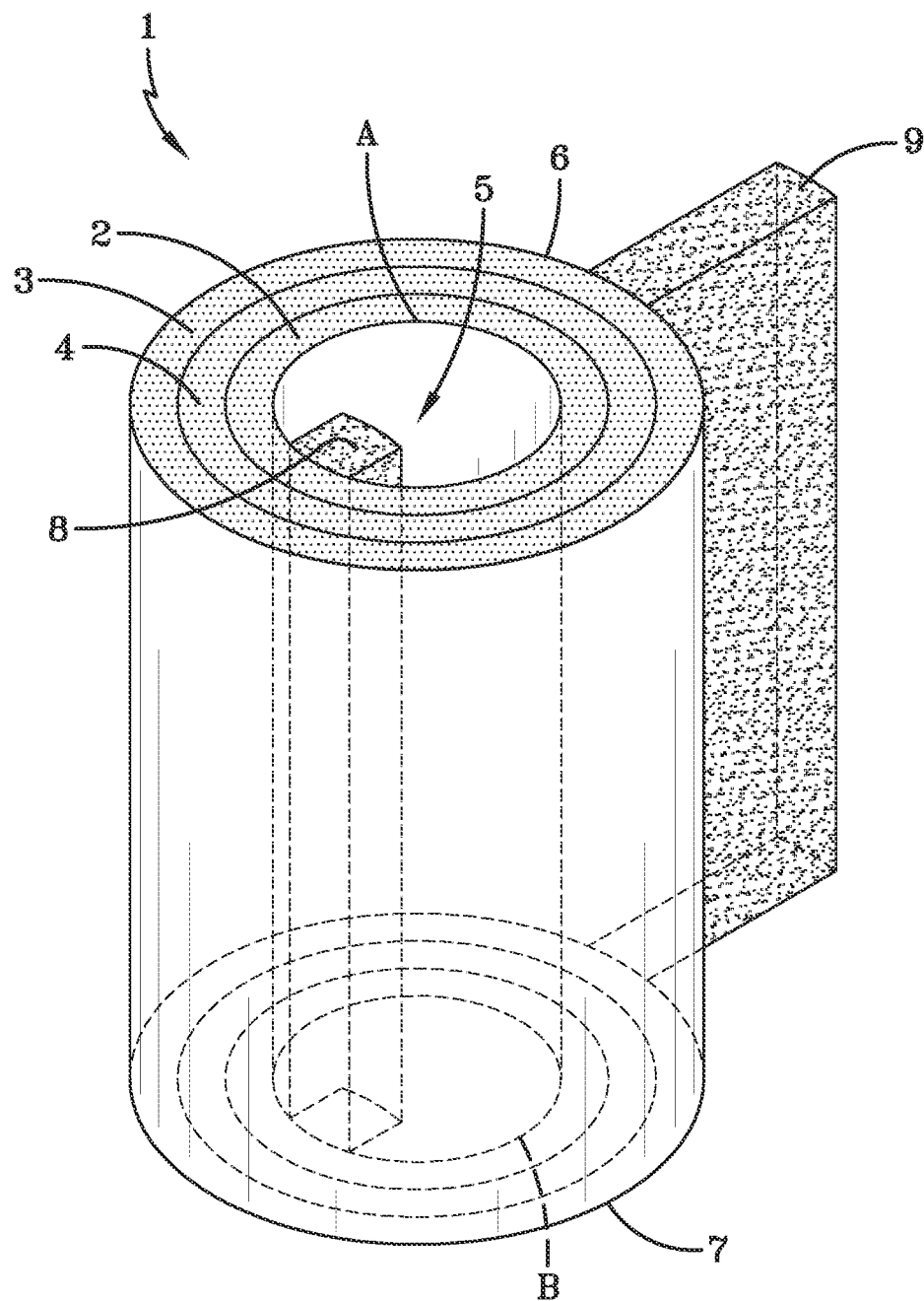
FIG. 1 is a perspective view of a tubular solid oxide fuel cell (SOFC) compatible for use with a universal tubular solid oxide fuel cell testing device in accordance with the concepts and disclosures presented herein.

Various embodiments of a universal testing device for a tubular solid oxide fuel cell (SOFC) are presented herein. The testing device is configured for use with tubular SOFCs, also referred to herein as SOFC(s), which are electrochemical devices having various tubular cross-sectional arrangements of an anode, cathode and an electrolyte. One example of an SOFC for use with the various embodiments of the testing device disclosed herein is referred to by numeral 1, as shown in FIG. 1. The SOFC 1 has a cross-sectional profile in which a central electrode, such as anode 2, an outer electrode, such as cathode 3, and an electrolyte 4 are arranged in concentric layers forming a tubular structure. Additionally, the anode 2 forms a tubular central cavity 5 having a cylindrical cross-section that extends between the ends 6 and 7 of the SOFC 1; the cathode 3 forms an outer surface of the SOFC 1; and the electrolyte 4 is positioned between, and in operative communication with, the anode 2 and cathode 3. Furthermore, an electrically conductive interconnect or current collector 8 is in electrical communication or coupled with the anode 2, while another electrical interconnect or current collector 9 is in electrical communication or coupled to the cathode 3. However, it should be appreciated that the SOFC 1 may also take on other design configurations, such as where the anode 2 forms the outer surface of the SOFC 1 and the cathode 3 forms the central cavity 5 of the SOFC 1. Moreover, the SOFC 1, including the central cavity 5, may have any suitable cross-sectional shape, such as a cylindrical shape, as well as a rectilinear shape, a curvilinear shape, or any combination thereof. Thus, while the SOFC 1 of FIG. 1 is presented for exemplary purposes with regard to the embodiments of the testing device discussed herein, the various embodiments of the testing device presented herein may be configured for use with any suitable tubular SOFC.

Figure 2:
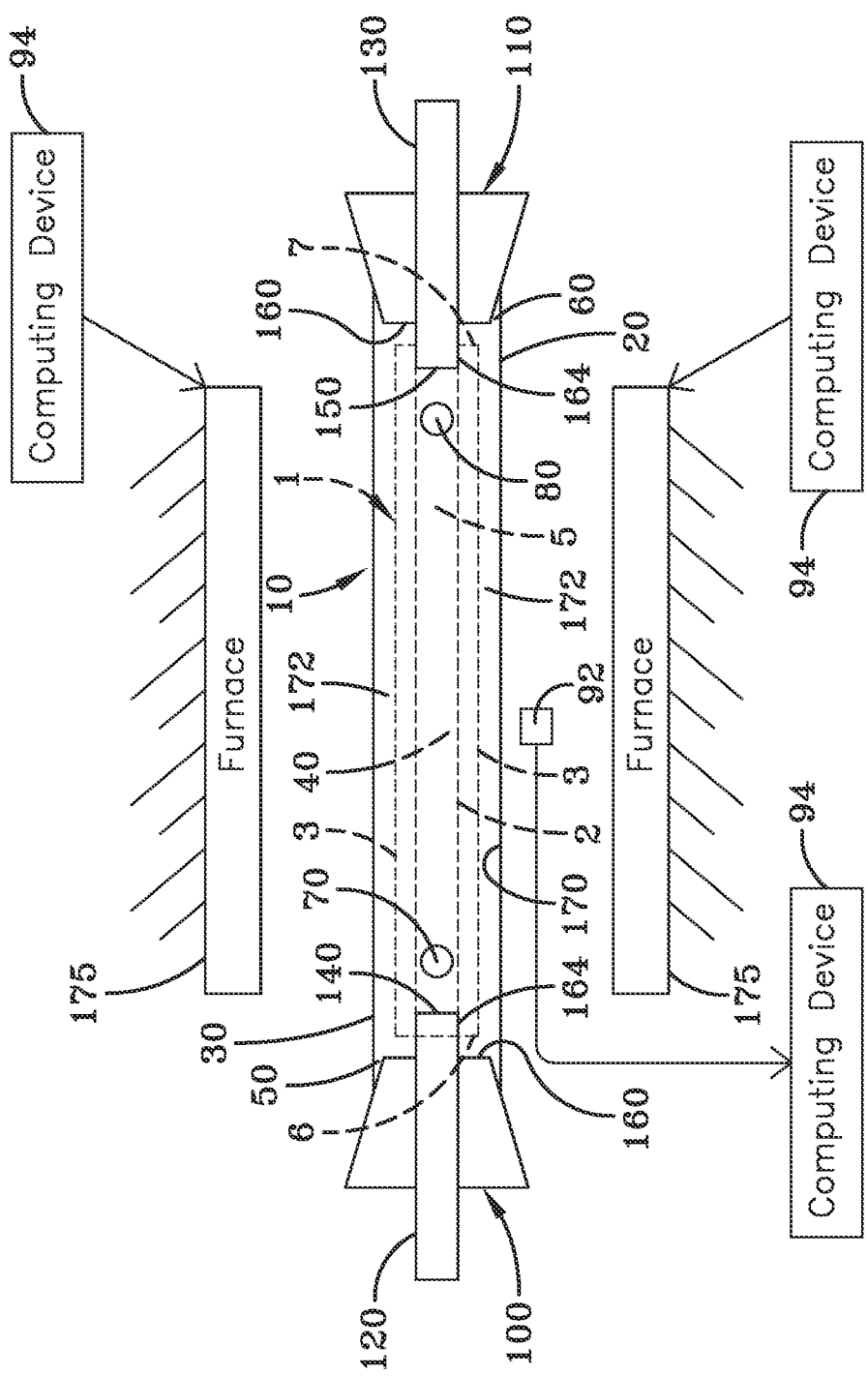
FIG. 2 is a schematic view of one embodiment of the universal tubular solid oxide fuel cell testing device in accordance with the concepts and disclosures presented herein.

One embodiment of the universal solid oxide fuel cell testing device 10 is shown in FIG. 2 of the drawings. The testing device 10 includes a housing 20, which may be formed of one or more sections. The housing 20 has a tubular wall 30 that defines therein a housing cavity 40. The housing 20 is terminated at ends 50 and 60 that open into the cavity 40. It should be appreciated that the tubular wall 30 may take on any desired cross-sectional shape, such as a cylindrical shape for example, as well as a rectilinear shape, curvilinear shape, or combination thereof. It should be appreciated that the housing cavity 40 is configured to receive therewithin the SOFC 1 and is accordingly dimensioned to any size or shape so that it is compatible with the dimensions of the SOFC that is to be inserted therein. The housing 20 may be formed of ceramic or glass material, such as alumina, zirconia, or quartz for example, as well as Inconel or Crofer 22 APU, or any other suitable material, such as materials capable of withstanding operating temperatures of SOFCs, and composites thereof. Disposed through the wall 30 of the housing 20 is an inlet aperture 70 and an outlet aperture 80, which open into the housing cavity 40. The inlet aperture 70 and outlet aperture 80 may comprise any suitable dimension or shape and may be positioned anywhere relative to the wall 30 of the housing 20. In some embodiments, the inlet aperture 70 may be positioned proximate to one of the ends 50, 60 of the housing 20 while the outlet aperture 80 is positioned proximate to the other end 60 of the housing 20.

In some embodiments, the housing 20 may include one or more sensor apertures or ports (not shown) that are configured to receive one or more sensing devices 92 for monitoring various operating parameters or characteristics of the housing cavity 40 and/or of the SOFC 1 that is positioned within the housing 20. In some embodiments, the sensor 92 may communicate through a wired or wireless communication interface with a computing device 94, such as a remote computing device, including cloud computing devices, or a local computing device for example. In some embodiments, the sensor 92 may include a thermocouple, or other temperature sensing device for example, which may be positioned in the sensor aperture. Alternatively, wire leads may be disposed through the sensor port or aperture so that the sensor 92 may be positioned within the housing cavity 40 to monitor the temperature of the environment surrounding the SOFC 1. Alternatively, the sensor 92 may be positioned in a gap between the furnace 175 and the housing 20.

It should be appreciated that a seal compatible with the operating temperature of the SOFC, such as a grommet, mastic, epoxy or the like, may be used to seal any sensor or wire positioned in, or passing through the sensor aperture, or to completely seal the sensor aperture if it is not being used. Alternatively, in some embodiments, the sensor aperture and the sensor 92 may not be used.

Attached to the ends 50 and 60 of the housing 20 are respective caps 100 and 110. The caps 100,110 are configured so that at least one cap is removable from the housing 20. That is, in some embodiments, one of the caps 100,110 is configured to be removable, while the other cap 100,110 is permanently affixed to, or made integral with, the housing 20. However, in other embodiments both caps 100,110 may be removable from the housing 20. Furthermore, the caps 100,110 may be configured to be removably attached to the housing 20 using any suitable means of attachment, such as slip-fit, friction-fit, threaded-fit, and the like. The caps 100, 110 include respective inlet and outlet ports 120,130, which in some embodiments are in substantial axial alignment with the hosing 20, and which are in operative communication with the housing cavity 40 when the caps 100,110 are attached to the housing 20.

The ends of the inlet port 120 and the outlet port 130 that are positioned proximate to, or within, the housing cavity 40 when the caps 100,110 are attached to the housing 20, define respective interfaces 140 and 150. The interfaces 140 and 150 of the inlet port 120 and the outlet port 130 are dimensioned and shaped to be compatible for placement in operative communication with the cross-sectional shape of the central cavity 5 of the SOFC 1 that is being tested by the device 10, such as SOFC 1. That is, the interface 140 of the inlet port 120 and the interface 150 of the outlet port 130 are configured to be placed in fluid communication with a portion of the central cavity 5 that is proximate to ends 5 and 7 of the SOFC 1 to allow a gas material to flow into the inlet port 120, through the central cavity 5 of the SOFC 1, and out of the outlet port 130. The terms "fluid communication", "fluidly communicate", "operative communication", or "operatively communicate", as used herein, are defined as the ability of two structures to transfer gaseous material between each other. For example, where the central cavity 5 of the SOFC 1 has a cylindrical cross-section, the interfaces 140 and 150 comprise complementary cylindrical openings that are capable of being placed in operative communication with the central cavity 5. Thus, in some embodiments, the inlet port and outlet ports 120,130 may be configured so that the interfaces 140,150 are flush with an inner surface 160 of the end caps 100,110. Alternatively, the interfaces 140,150 may be offset from the inner surface 160 of the end caps 100,110 by an interface tube 164, as shown in FIG. 2. Specifically, the interface tubes 164 include the portion of the inlet and outlet ports 120,130 that extend from the inner surface 160 of each of the caps 100,110 and into the housing cavity 40. In other words, the interfaces 140,150 may be configured to be positioned or received within the central cavity 5 of the SOFC 1 in the case of the interface tubes 164 or may be configured to be positioned flush with and/or adjacent to the central cavity 5, in the case where the interfaces 140,150 are positioned flush with the inner surface 160 of the caps 100,110. For example, as shown in the embodiment of FIG. 2, the interface tube 164 of the inlet port 120 and the interface tube 164 of the outlet port 130 has a cylindrical cross-sectional shape that is configured for receipt within the central cavity 5 of the SOFC 1. It should be appreciated that in some embodiments, the caps 100,110 may not be attached to the housing 20 and serve only to enable the inlet and outlet ports 120,130 to be placed in fluid communication with the central cavity 5 of the SOFC 1.

It should be appreciated that the testing device 10 may also include support structures, such as support tubes for example that are capable of receiving therein the ends 6 and 7 of the outer diameter of SOFC 1, or portion thereof, while allowing the interfaces 140,150 to be placed and maintained in fluid communication with the central cavity 5 of the SOFC 1. Accordingly, the support tubes serve to support the SOFC 1 within the housing cavity 40, so that the outer surface or cathode 3 of the SOFC 1 is spaced away from an inner surface 170 of the housing 20 by a gap 172. Similarly, the interface tubes 164 of the inlet port and outlet port 120,140 may also serve to support the SOFC 1 within the housing cavity 40, and in some embodiments support the SOFC 1 so that its outer surface or cathode 3 of the SOFC 1, is spaced away from the inner surface of the housing wall 30 by the gap 172.

It should also be appreciated that in some embodiments, a seal compatible with the operating temperatures of the SOFC 1, such as a gasket or O-ring, may be used to form a seal between the central cavity 5 of the SOFC 1 and the interfaces 140,150 of the inlet and outlet 120,130. Alternatively, the seal may be formed by a compression fit between the interfaces 140,150 and the inlet and outlet 120,130. For example, the seal may be positioned between the interfaces 140,150 and the central cavity 5 of the SOFC 1, or between the ends 6,7 of the SOFC 1 and the inner surface 160 of the caps 100,110 while allowing the interfaces 140,150 to fluidly communicate with the central cavity 5 of the SOFC 1. Accordingly, the housing 20 and the caps 100,110 serve to define two separate, sealed passages for two different gas materials to flow. Thus, one passage is defined by the inlet tube 120, the central cavity 5 of the SOFC 1, and the outlet tube 130; and a second passage is defined by the inlet aperture 70, the gap 172 formed in the housing cavity 40, and the outlet aperture 80.

During operation of the testing device 10, the SOFC 1 is placed into the housing cavity 40, and the interfaces 140 and 150 of the inlet port 120 and the outlet port 130 are placed into fluid communication with the central cavity 5 of the SOFC 1. Accordingly, fuel gas, such as hydrogen gas, is permitted to flow through the inlet port 120, and into the central cavity 5 of the SOFC 1 for interaction with anode 2, whereupon any remaining gas and/or reaction by-products are exhausted out of the SOFC 1 through the outlet port 130. Thus, as the fuel gas is being supplied to the SOFC 1, oxidant gas, such as oxygen or air, is delivered via the inlet aperture 70 into the gap 172 within the housing cavity 40, whereupon the oxidant gas interacts with the cathode 3. As previously discussed, the housing cavity 40 is configured so that the gap 172 is formed between the outer surface, or cathode 3, of the SOFC 1 and the inner surface 170 of the wall 30 forming the housing cavity 40. This enables oxidant gas, such as air, which delivered into the inlet aperture 70 to flow into the gap 172 to surround or partially surround the SOFC 1 and interact with the cathode 3 of the SOFC 1. Next, any remaining oxidant gas and/or reaction-by-products are permitted to exit the housing cavity 40 through the outlet aperture 80.

In addition, during the operating steps discussed above, the testing device 10 and SOFC 1 therewithin may be heated to a suitable SOFC operating temperature by a heating device 175, such as a tubular testing furnace. In some embodiments, the heating device 175 and the computing device 94 may be placed in operative communication with each other, such as by a wired or wireless communication interface, so that the heating device 175 can be controlled to adjust the heat level that is output therefrom based on the temperature that is detected by sensor 92.

It should be appreciated that while the discussion of the various embodiments of the testing device 10 are presented for use with the SOFC 1 in which the inlet/outlet ports 120,130 carry fuel gas, such as hydrogen gas, and where the inlet/outlet apertures 70,80 carry oxidant gas, such as oxygen, the testing device 10 may carry any desired material through the inlet/outlet ports 120,130 and the inlet/outlet apertures 70,80. For example, in the case where alternative SOFC designs are utilized, the inlet/outlet ports 120,130 may alternatively carry oxidant gas, such as oxygen, and the inlet/outlet apertures 70,80 may alternatively carry fuel gas, such as hydrogen.

It should further be appreciated that in some embodiments, when the testing device 10 is used with oxidant gas, such as air, the testing device 10 may be configured without the housing 20, such that only the caps 100, 110 are utilized so that the interfaces 140 and 150 are placed in fluid communication with the central cavity 5 of the SOFC 1.

Figure 3:
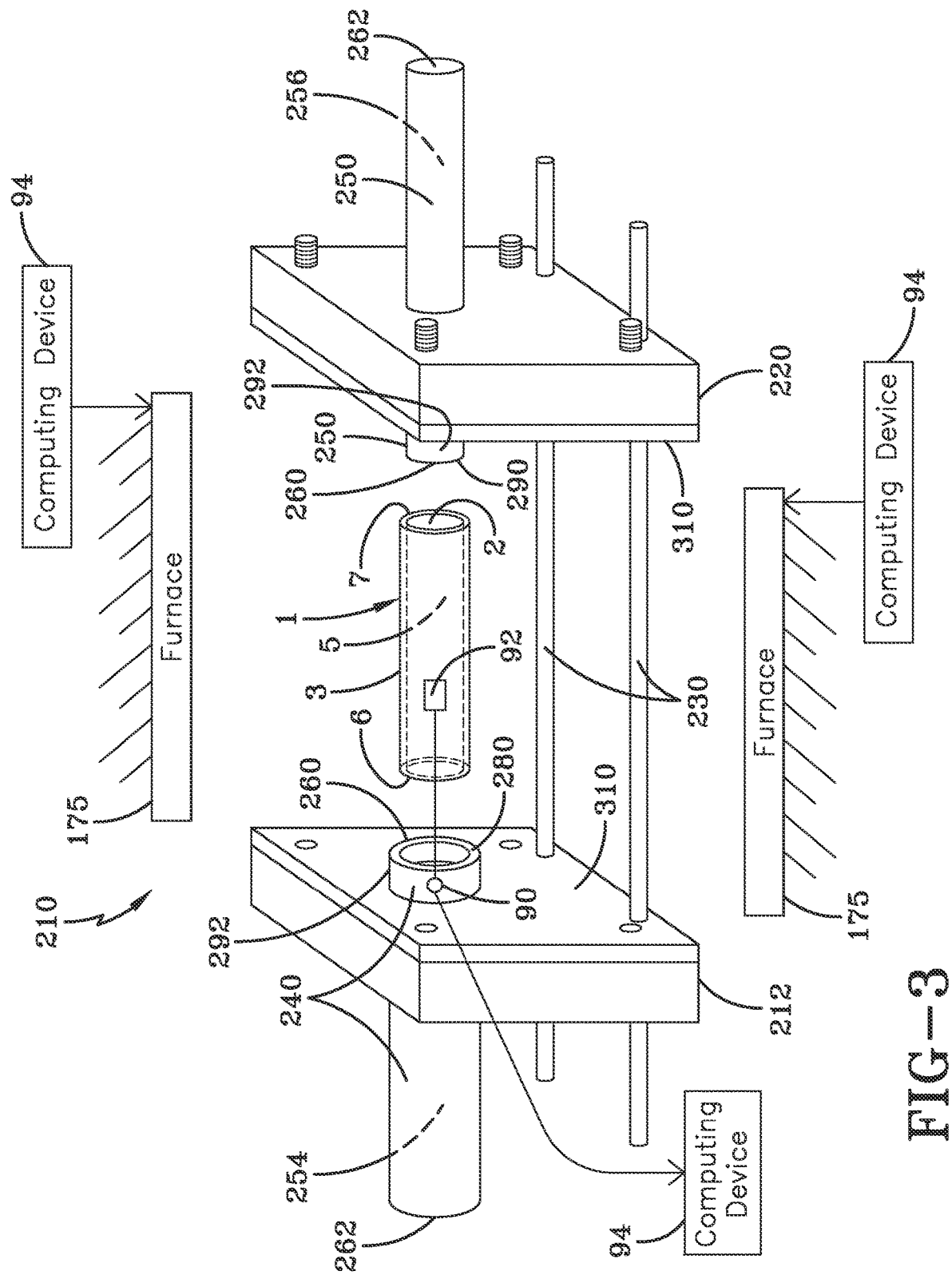
FIG. 3 is a perspective view of another embodiment of the universal tubular solid oxide fuel cell testing device in accordance with the concepts and disclosures presented herein.
Figure 4:
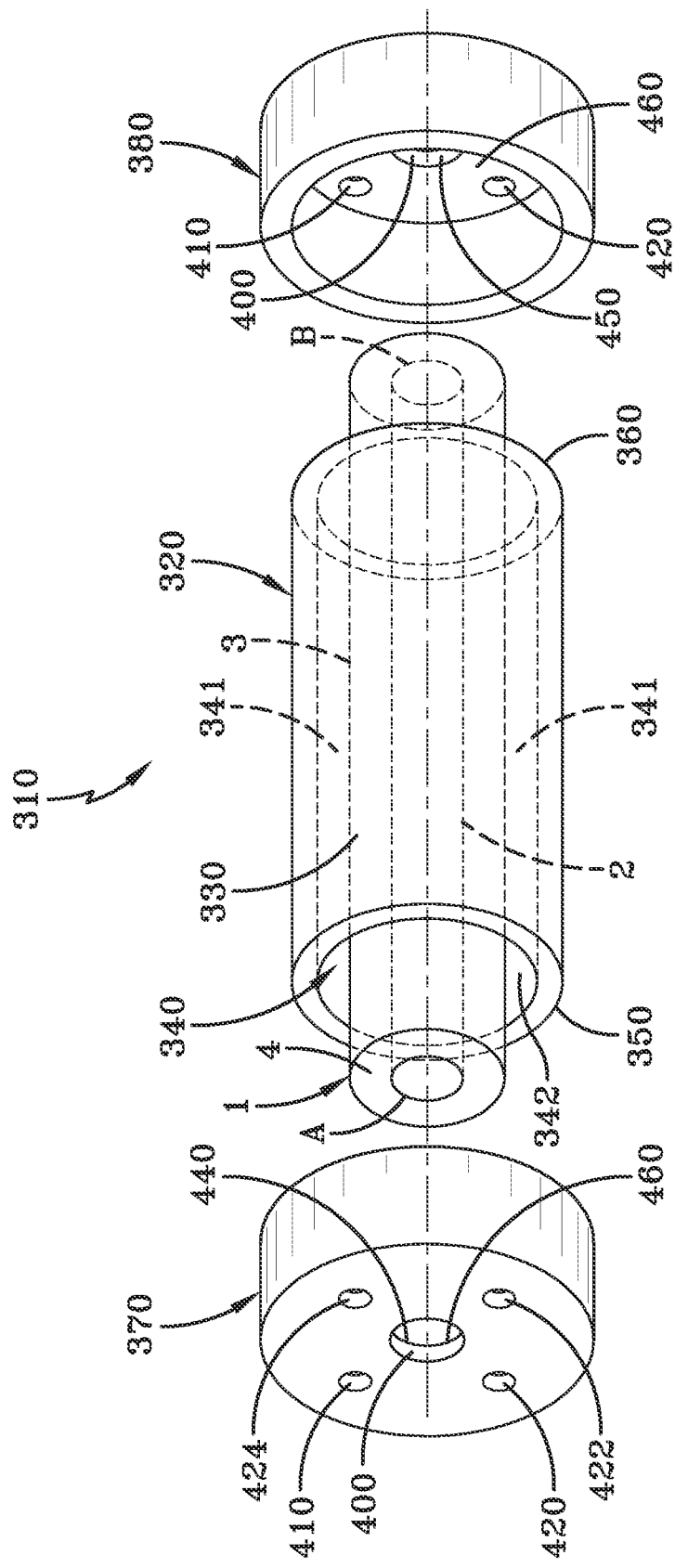
FIG. 4 is an exploded perspective view of another embodiment of the universal solid oxide fuel cell testing device in accordance with the concepts and disclosures presented herein.

Another embodiment of the tubular SOFC testing device referred to by numeral 210 is shown in FIG. 3. The testing device 210 includes an inlet fixture 212 and an outlet fixture 220 that are moveable along a track 230. The inlet and outlet fixtures 212,220 comprise any suitable structure that is capable of carrying respective inlet and outlet tubes 240 and 250.

The track 230 may comprise any suitable structure that defines a path that the inlet and outlet fixtures 212,220 are guided by, or required to follow, as they are moved, such as by sliding or rolling for example. It should be appreciated that in some embodiments, the track 230 may comprise one or more elongated screws that moveably join the fixtures 212,220. In addition, the elongated screws are configured to be threadably received in one or more of the fixtures 212,220, so as to secure the fixtures 212,220 together with a desired amount of force. As such, when the ends 6 and 7 of the SOFC 1 are positioned in operative communication with the interfaces 280,290, the fixtures 212,220 may be tightened by the screws forming the track 230 so that adequate compression is achieved between the fixtures 212, 220 and the SOFC 1, thereby allowing the SOFC 1 to form a suitable seal with the interfaces 280,290.

In other embodiments, the track 230 may comprise one or more grooves or projections that interface corresponding, respective projections or grooves that are provided by the fixtures 212,220. The track 230 may also be part of a support surface or may be provided as an independent structure that is attached only to the fixtures 212,220. In some embodiments, the track 230 may be configured so that both of the fixtures 212,220 may be moved or may be configured so that only one of the fixtures 212,220 is able to be moved. In other embodiments, as shown in FIG. 3, the track 230 may comprise one or more elongated sections, such as rails, tubes, or rods that join the fixtures 212,220 so that they can move, for example, relative to the track 230. It should also be appreciated that a locking mechanism may be included with one or more of the fixtures 212,220 to allow one or more of the fixtures 212,220 to be selectively locked or fixed in position relative to the track 230. For example, the locking mechanism may comprise a removable locking pin, screw, or the like that is received by one or more of the fixtures 212,220 and by the track 230. It should be appreciated that in other embodiments, the fixtures 212, 220 may be utilized without the track 230, such that the fixtures 212,220 are capable of being removably affixed to various, multiple areas of a support surface, such as a table or a rigid base, or in some embodiments to each other. For example, the various areas on the support surface may include a protrusion, recess or other keyed feature that is compatible for being operatively interfaced with a complementary recess protrusion or keyed feature that is provided by the fixtures 212,220, so as to retain the fixtures 212,220 in place relative to the support structure or track 230. Accordingly, the fixtures 212,220 may be moved apart as needed by affixing the fixtures 212,220 to appropriate areas of the support structure or track 230.

The inlet and outlet tubes 240 and 250 are hollow and include respective mounting cavities 254,256 therewithin. The tubes 240,250 are also positioned relative to their respective fixtures 212,220 so that they are substantially axially aligned with one another. In some embodiments, the tubes 240,250 have a cylindrical cross-section, but may be configured to have any suitable cross-sectional shape, such as a rectilinear shape, a curvilinear shape, or any combination thereof to accommodate the shape and dimension of the SOFC 1 that is being tested. The inlet tube 240 and the outlet tube 250 each include inner and outer open ends 260 and 262 that open into the cavities 254,256. The inner ends 260 of the inlet and outlet tubes 240,250 are positioned to be in opposition to each other, and include respective interfaces 280 and 290, which define the shape and dimension of the opening of the inner ends 260. It should be appreciated that the tubes 240,250, as well as in some cases other portions of the fixtures 212,220 may be formed of ceramic or glass material, such as alumina, zirconia, or quartz, as well as any other suitable material capable of withstanding operating temperatures of SOFCs, such as Inconel or Crofer 22 APU and composites thereof.

The interfaces 280,290 of the inlet tube 240 and the outlet tube 250 are dimensioned and shaped to be compatible for placement in fluid communication with the central cavity 5 of the SOFC 1 that is being tested by the device 210. In other words, the interface 280 of the inlet tube 240 and the interface 290 of the outlet tube 250 are shaped, dimensioned, or otherwise configured to be in fluid communication with the respective portions of the central cavity 5 that are proximate to ends 6 and 7 of the SOFC 1. For example, where the central cavity 5 of the SOFC 1 has a cylindrical cross-section, the interfaces 280 and 290 comprise complementary cylindrical openings that are configured for being placed in operative communication of with the central cavity 5 SOFC. In some embodiments, the interfaces 280,290 may be positioned flush with a surface, such as an inner surface 310 of the fixtures 212,220. Alternatively, the interfaces 280,290 may be offset from the inner surface 310 of the fixtures 212,220 by a portion of the inlet and outlet tubes 240,250 that extend from the inner surface 310 of the interfaces 212,220, which is referred to as an interface tube 292. For example, as shown in FIG. 3, the interface tube 292 has a cylindrical cross-sectional shape configured for communication within the central cavity 5 proximate to each end 6,7 of the SOFC 1. It should be appreciated that in some embodiments, the interfaces 280,290 are configured so that they are capable of being placed within the central cavity 5 of the SOFC 1 or may be configured to receive the outer diameter of the SOFC 1 while still being in fluid communication with the central cavity 5 of the SOFC 1. In addition, the SOFC 1 and the interfaces 280,290 may be configured to allow a suitable seal to be formed between the central cavity 5 of the SOFC 1 and the inlet tube and outlet tube 240,250. For example, a suitable seal, such as a gasket or O-ring, may also be incorporated between the SOFC 1 and the inlet and outlet tubes 240,250. Alternatively, the locking mechanism discussed above may also be configured to lock the fixtures 212 and 220 in position so that the interfaces 280 and 290 provided thereby apply suitable compression to the ends 6,7 of the SOFC 1, such that a compression seal is formed with the central cavity 5 and the inlet and outlet tubes 240,250.

In some embodiments, a pair of support tubes (not shown) which extend from a surface such as the inner surface 310, of the respective fixtures 212 and 220, which are able to receive therein the outer diameter of the ends 6,7 of SOFC 1 may be provided by the testing device 210. Thus, in the case where the interfaces 280,290 are flush with the inner surface 310 of the fixtures 212,220, the support tubes may serve to maintain the axial of the central cavity 5 of the SOFC 1 in adjacent, axial alignment with the interface 280,290 of the inlet and outlet tubes 240,250.

In addition, the testing device 210 may include the sensor port 90, sensor 92, computing device 94 and furnace 175, which operate as previously discussed.

During operation of the testing device 210, the fixtures 212,220 are moved apart, such as by moving them relative to the track 230. Next, the portion of the central cavity 5 proximate to end 6 of the SOFC 1 is placed in operative communication with the interface 280 of the inlet tube 240, and the portion of the central cavity 5 proximate to the end 7 of the tubular SOFC 1 is placed in operative communication with the interface 290 of the outlet tube 250. During this process, one or more of the fixtures 212,220 may be moved as necessary to facilitate the placement of the SOFC 1 into the testing device 210. After the SOFC 1 is inserted into the testing device 210, one or more of the fixtures 212,220 may be moved as needed to adjust the amount of distance that exists between the fixtures 212,220, and the interfaces 280,290, including ends 260 of the tubes 240,250, so as to adjust the amount of compression or pressure applied to the seal, which may include gaskets or O-rings. In some cases, such adjustment process may be utilized to control the amount of air, or other oxidant, such as oxygen, which is permitted to come into contact with the cathode 3 of the SOFC 1. Thus, once the fixtures 212,220 and the SOFC 1 are placed into the desired position, fuel gas, such as hydrogen, is supplied into the inlet tube 240, which passes into the central cavity 5 of the SOFC 1 where it interacts with the anode 2. Any remaining fuel gas and/or by-products of the interaction of the fuel gas and the anode 2 are then permitted to exit the SOFC 1 through the outlet tube 250. In addition, oxidant gas, such as air or oxygen, is permitted to interact with the cathode 3 that is left exposed by the spaced apart fixtures 212,220.

In addition, the testing device 210 may be heated by the heating device 175 so that the SOFC 1 that is inserted into the testing device 210 is heated to a suitable temperature for operation. In addition, such operation may be carried out by the operation of the sensor 92 and computing device 94, as previously discussed.

It should be appreciated that while the discussion of the various embodiments of the testing device 210 are presented for use with the SOFC 1 in which the inlet/outlet tubes 240,250 carry fuel gas, such as hydrogen gas, the testing device 210 may carry any desired material through the inlet/outlet tubes 240,250. For example, in the case where alternative SOFC designs are utilized, the inlet/outlet tubes 240,250 may alternatively carry oxidant gas, such as air or oxygen.

Another embodiment of the tubular SOFC testing device referred to by numeral 310 is shown in FIGS. 4-7. The testing device 310 includes a housing 320 that includes a tubular wall 330 that defines a housing cavity 340 therein. The tubular wall 330 may have a cylindrical cross-sectional shape but may be configured to have any suitable cross-sectional shape, such as a rectilinear shape, a curvilinear shape, or combinations thereof to receive the dimension and shape of the SOFC 1 that is being tested by the device 310.

In some embodiments, one or more spacers (not shown) may be included within the housing cavity 340, such as between the outer surface, or cathode 3, of the SOFC 1 and an inner surface 342 of the housing 320, so as to form a gap 341. As such, the gap 341 functions so that the cathode 3 of the SOFC 1, is not entirely blocked or occluded by the inner surface 342 of the housing 320. Accordingly, the gap 341 between the outer surface of the SOFC 1 and the inner surface 342 of the housing 320 operates to enhance the flow of gas material around the SOFC 1 in a manner to be discussed. It should also be appreciated that the housing 320 may be formed of any suitable material, such as ceramic or glass, including but not limited to alumina, zirconia, or quartz, as well as Inconel or Crofer 22 APU, and composites thereof.

The housing 320 is terminated by ends 350 and 360 that open into the housing cavity 340 and are configured to be attached to respective inlet and outlet caps 370,380. The caps 370 and 380 are configured to be removably attached to the housing 320 using any suitable means of fixation, such as friction-fit, slip-fit, threaded-fit, and the like. However, it should be appreciated that in some embodiments at least one of the caps 370,380 is removable from the housing 320, while the remaining cap is permanently affixed to the housing 320. It should be appreciated that any cap 370,380 may be permanently attached to the housing 320 using any suitable means, such as adhesive, welding or the like. Furthermore, in some embodiments the permanently attached cap 370,380 may be made integral with the housing 320. Furthermore, the caps 370,380 may be formed of any suitable material, such as $Al_2O_3$.

Each of the caps 370,380 includes various ports, including a fuel port 400, an oxidant port 410, a primary accessory port 420, a secondary accessory port 422, and an electrical lead port 424. The ports 400, 410, 420, 422, and 424 are arranged in some embodiments so that the fuel port 400 is substantially surrounded by the other ports 410, 420, 422 and 424. Thus, when the caps 370,380 are attached to the housing 320, the fuel ports 400 of each cap 370,380 are configured to be substantially axially aligned with each other, along with the housing cavity 342 and the central cavity 5 of the SOFC 1 that is inserted into the housing 320 for testing. As such, the fuel ports 400 of the caps 370,380 permit the flow of a fuel gas, such as hydrogen, through the inlet cap 370, and into the central cavity 5 of the SOFC 1, and out of the outlet cap 380. The oxidant port 410, which is some embodiments, is positioned on the periphery of the caps 370,380, permits the flow of an oxidant gas, such as air or oxygen, into the housing cavity 340 of the housing 320. However, the fuel port 400 and the oxidant port 410 may be configured to carry any gas, such that port 400 carries an oxidant gas, such as air or oxygen, and the port 410 carries a fuel gas, such as hydrogen. The primary and secondary accessory ports 420, 422 are provided to allow an accessory, such as sensor 92, to be positioned in the ports 420,422 themselves, or to allow a connector, such as wire to pass through the ports 420,422 that is connected to one or more sensors 92 that is positioned within the housing cavity 340. For example, the sensors 92 may comprise a temperature sensor to monitor the temperature of the housing cavity 340, which may be coupled through a wired or wireless communication interface to a suitable computing device, such as a remote computing device such as a cloud computer device, or a local computing device. It should be appreciated that while the caps 370,380 include the fuel ports 400, and the oxidant ports 410, only one of the caps 370,380 is required to have the accessory ports 420,422. It should also be appreciated that is some embodiments that one or more of the caps 370,380 may be configured to have any number of fuel ports 400, oxidant ports 410, and accessory ports 420,422. In addition, the electrical lead port 424 is configured to receive any suitable electrical connector, such as a wire, which is attached to the interconnect 8 of the anode 2, and/or to an electrical interconnect of the cathode 3 of the SOFC 1. However, it should be appreciated that in some embodiments, the electrical interconnect coupled to the anode 2 passes through the fuel port 400 of one or more of the caps 370,380, while the electrical interconnect coupled to the cathode 3 passes through the electrical lead port 424 of one or more of the caps 370,380.

The portion of the fuel ports 400 of the inlet cap 370 and the outlet cap 380 that are positioned proximate to, or within the housing cavity 340, define respective interfaces 440 and 450. The interfaces 440 and 450 of the inlet cap 370 and the outlet cap 380 are dimensioned and shaped to be compatible for placement in fluid communication with the cross-sectional shape of the central cavity 5 of the SOFC 1 that is being tested by the device 310, such as SOFC 1. That is, the interface 440 of the inlet cap 370 and the interface 450 of the outlet cap 380 are configured to be placed in fluid communication with a portion of the central cavity 5 that is proximate to ends 5 and 7 of the SOFC 1 to allow a gas material to flow into the fuel port 400 of the inlet cap 370, through the central cavity 5 of the SOFC 1, and out of the fuel port 400 of the outlet cap 380. For example, where the central cavity 5 of the SOFC 1 has a cylindrical cross-section, the interfaces 440 and 450 comprise complementary cylindrical openings that are able to be placed in operative communication with the central cavity 5. Thus, in some embodiments, the inlet port and outlet ports 120,130 may be configured so that the interfaces 440,450 are flush with an inner surface 460 of the caps 370,380 that is proximate to the cavity 342. Alternatively, the interfaces 440,450 may be offset from the inner surface 460 of the end caps 100,110 by an interface tube (not shown), such as interface tube 164 discussed with regard to testing device 10. Specifically, the interface tubes are in operative communication with the fuel ports 400 and extend from the inner surface 460 of each of the caps 370,380 and into the housing cavity 40. In other words, the interfaces 440,450 may be configured to be positioned within the central cavity 5 of the SOFC 1 in the case of the interface tubes or may be configured to be positioned flush or adjacent with the central cavity 5.

It should be appreciated that the testing device 10 may also include support structures, which in some embodiments may comprise support tubes, that extend from the inner surface 460 of the caps 370,380, which are capable of receiving therein the ends 6 and 7 of the outer diameter of SOFC 1, or portion thereof, while allowing the interfaces 440,450 to be placed in operative communication with the central cavity 5 of the SOFC 1. Accordingly, the support tubes serve to support the SOFC 1 within the housing cavity 40, so that the outer surface or cathode 3 of the SOFC 1 is spaced away from the inner surface 342 of the housing 320 by the gap 341. Similarly, the interfaces 440,450 of the inlet port and outlet port 120,140 may also serve to support the SOFC 1 within the housing cavity 340 so that its outer surface or cathode 3 of the SOFC 1 is spaced away from the inner surface 342 of the housing 320 by a gap.

It should also be appreciated that a suitable seal, such as a gasket or O-ring, may be used to form a seal between the central cavity 5 of the SOFC 1 and the interfaces 440,450 of the fuel ports 400 of the inlet and outlet caps 370,380. For example, the seal may be positioned between the interfaces 440,450 and the central cavity 5 of the SOFC 1, or between the ends 6,7 of the SOFC 1 and the inner surface 460 of the caps 370,380 while allowing the interfaces 440,450 to operatively communicate with the central cavity 5 of the SOFC 1.

Figure 5:
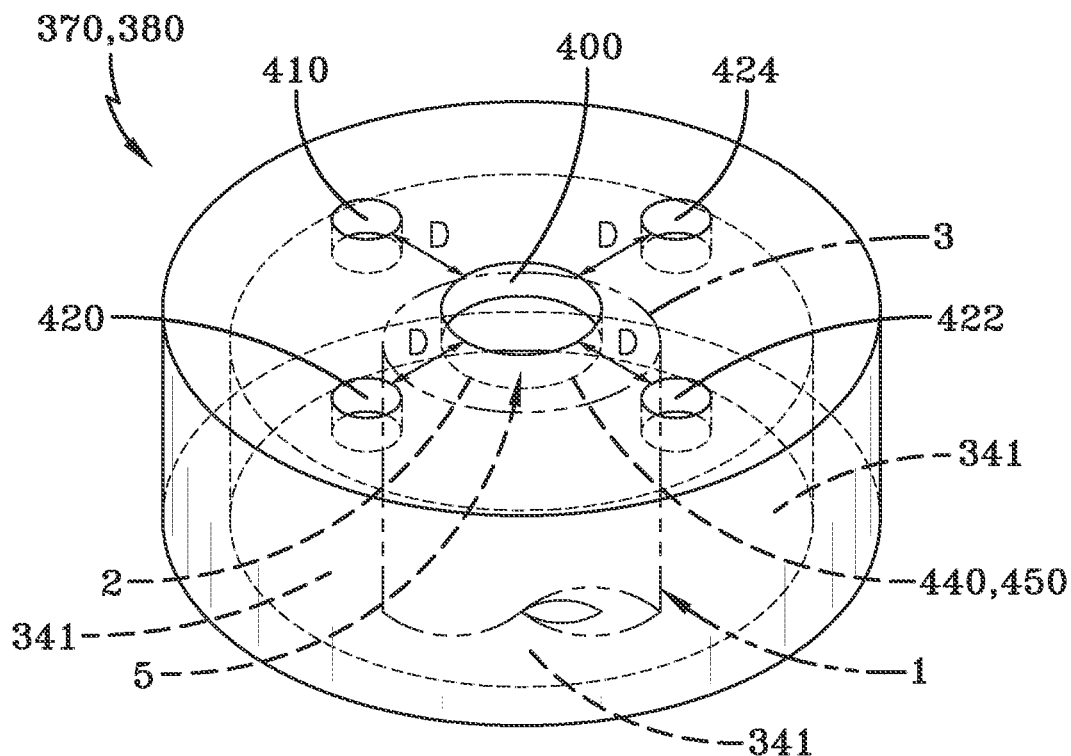
FIG. 5 is a perspective view of a cap for use with the embodiment of the testing device shown in FIG. 4 in accordance with the concepts and disclosures presented herein.
Figure 6:
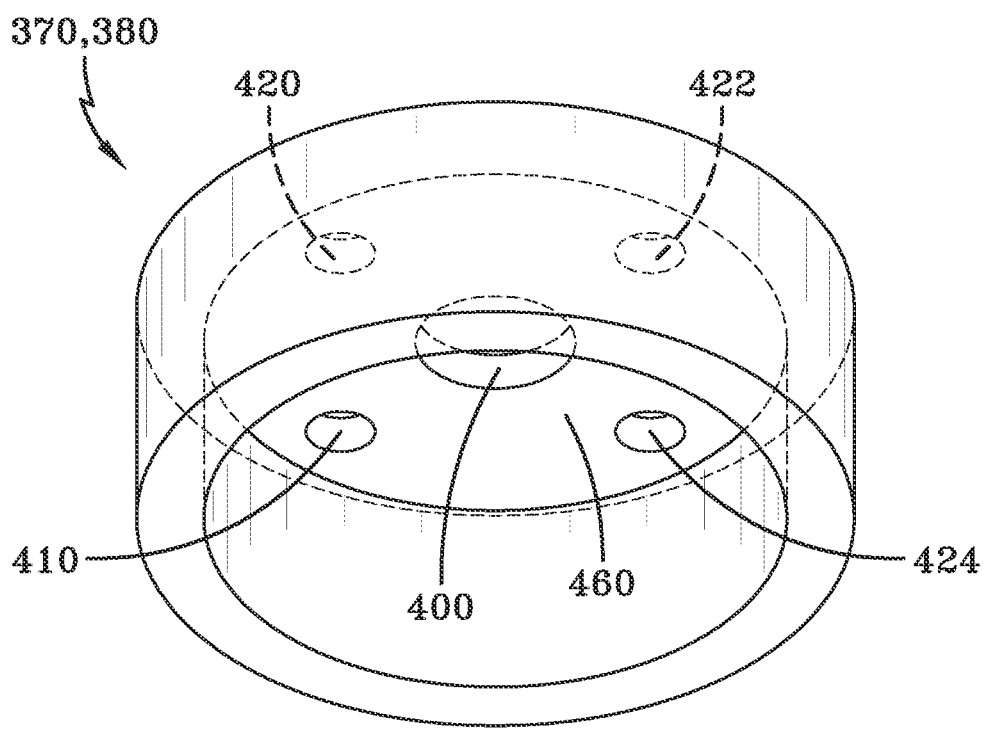
FIG. 6 is another perspective view of the cap shown in FIG. 5 in accordance with the concepts and disclosures presented herein.
Figure 7:
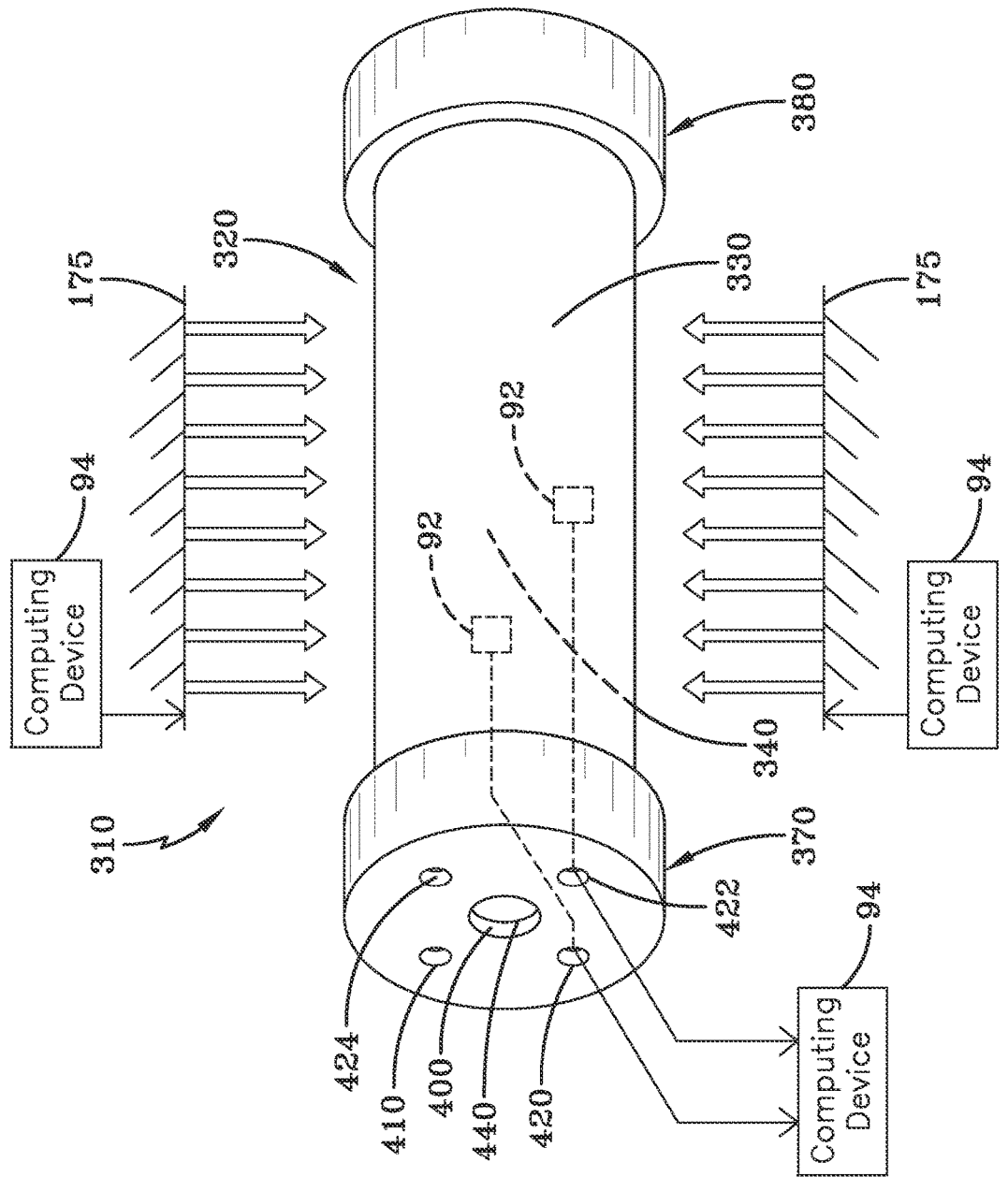
FIG. 7 is a perspective view of the universal solid oxide fuel cell testing device of FIG. 4 in accordance with the concepts and disclosures presented herein.

In addition, with regard to FIG. 5, each of the caps 370,380 are configured so that the fuel port 400 is spaced away from the peripheral edges of the oxidant port 410, primary accessory port 420, secondary accessory port 422 and electrical lead port 424 by a distance 'D'. This distance D is dimensioned so that cathode 3 of the SOFC 1 does not block the oxidant port 410, the primary accessory port 420, the secondary accessory port 422 and the electrical lead port 424 when the SOFC 1 is inserted into the housing 320 and the caps 370,380 are attached. As such, the outer diameter of the SOFC 1, defined by the cathode 3, is positioned so that it is within distance D of the caps 370,380. Thus, by virtue of this distance or spacing of the ports 400-424, the fuel port 400 of the caps 370,380 operatively communicates with only the central cavity 5 of the SOFC 1, and the oxidant port 410, primary accessory port 420, secondary accessory port 422 and electrical lead port 424 operatively communicate with only the housing cavity 340, including the gap 341 that is formed between the inner surface 342 of the housing 320 and the outer surface of the SOFC 1, which may include the cathode 3. Accordingly, the housing 320 and the caps 370,380 serve to define two separate, sealed passages for two different gas materials to flow. Thus, one passage is defined by the fuel port 400 of the inlet cap 370, the central cavity 5 of the SOFC 1, and the fuel port 400 of the outlet cap 380; and a second passage is defined by the oxidant port 410, primary accessory port 420, secondary accessory port 422 and electrical lead port 424 of the inlet cap 370, the gap 341 of the housing cavity 340, and the oxidant port 410, primary accessory port 420, secondary accessory port 422 and electrical lead port 424 of the outlet cap 380.

In addition, the testing device 310 may include one or more sensors 92, the computing device 94 and the furnace 175, which operate as previously discussed.

Thus, during operation of the testing device 310, the SOFC 1 is placed within the housing cavity 340. Next, the caps 370 and 380 are attached to respective ends 330,360 of the housing 320. As such, the fuel ports 400 of the inlet and outlet caps 370,380 are each placed in fluid communication with the central cavity 5 of the SOFC 1, and the oxidant port 410, primary accessory port 420, secondary accessory port 422 and electrical lead port 424 of the inlet and outlet caps 370,380 are placed in fluid communication with the gap 341 of the housing cavity 340. Next, fuel gas, such as hydrogen, is supplied through the central port 400 of the inlet cap 370 for receipt into the central cavity 5 of the SOFC 1, for interaction with the anode 2, whereupon any remaining fuel gas and/or reaction by-products are exhausted through the fuel port 400 of the outlet cap 380. In addition, oxidant gas, such as air or oxygen, is supplied through the oxidant port 410 of the inlet cap 370 and into the gap 341 of the housing cavity 340, which is the area of the housing cavity 340 formed between the outer surface of the SOFC 1 and the inner surface 342 of the housing 320, where the oxidant gas interacts with the cathode 3. Furthermore, any remaining oxidant gas and/or reaction by-products between the oxidant gas and the cathode 3 are exhausted through the oxidant port 410 of the outlet cap 380.

In addition, the testing device 310 may be heated by the heating device 175 so that the SOFC 1 that is inserted into the testing device 310 is heated to a suitable temperature for operation. In addition, such operation may be carried out by the operation of the sensor 92 and computing device 94, as previously discussed.

It should be appreciated that while the discussion of the various embodiments of the testing device 310 are presented for use with the SOFC 1 in which the fuel ports 400 of the inlet/outlet caps 370,380 carry fuel gas, such as hydrogen gas, and where the oxidant ports 410 of the inlet/outlet caps 370,380 carry oxidant gas, such as air or oxygen, the testing device 310 may carry any desired material through the fuel ports 400 and the oxidant ports 410. For example, in the case where alternative SOFC designs are utilized, the fuel ports 400 of the inlet/outlet caps 370,380 may alternatively carry oxidant gas, such as air or oxygen, and the oxidant ports 410 of the inlet/outlet caps 370,380 may alternatively carry fuel gas, such as hydrogen.

Figure 8:
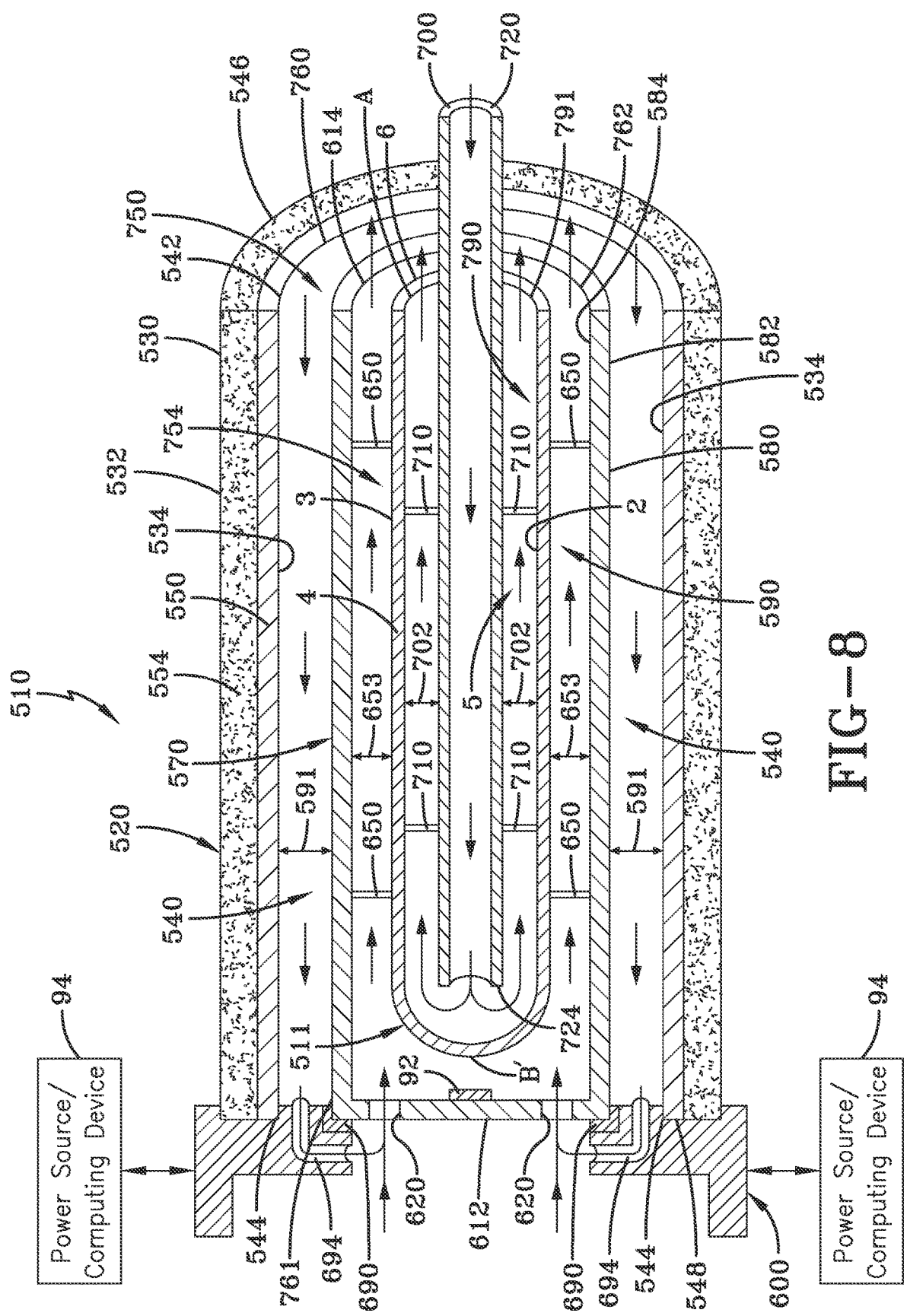
FIG. 8 is a cross-sectional view of another embodiment of the universal solid oxide fuel cell testing device in accordance with the concepts and disclosures presented herein.

Another embodiment of the tubular SOFC testing device referred to by numeral 510 is shown in FIG. 8. The testing device 510 is configured for use with a tubular SOFC, such as the tubular SOFC 511 also shown in FIG. 8. The SOFC 511 is structurally and functionally equivalent to the SOFC 1 as previously discussed, with the exception that opening B of SOFC 1 associated with the central cavity 5 is blocked or closed off, thus forming a closed end B' as shown in SOFC 511. As such, the SOFC 511 has only one opening 'A' that is in fluid communication with the central cavity 5. It should be appreciated that in some embodiments, the closed end B' of the cavity 5 of the SOFC 511 may be formed of the same layered configuration as the tubular structure of the SOFC 511, which includes the electrode 2, the electrolyte 4, and the electrode 3, as previously discussed with regard to SOFC 1.

The testing device 510 includes an insulating tube 520, which includes a wall 530 having an outer surface 532 and an inner surface 534 that defines therein an insulating cavity 540. The insulating cavity 540 is terminated by openings 542 and 544 that are proximate to respective ends 546 and 548 of the insulating tube 520. The insulating tube 520 may be formed to have a cylindrical shape as shown, as well as any other suitable tubular cross-sectional shape, such as a rectilinear shape, a curvilinear shape, or any combination thereof. The insulating tube 520 may be formed from any suitable heat resistant material that resists the transfer of heat, including heat that is generated within the insulating cavity 540 in a manner to be discussed. As such, the insulating tube 520 operates to keep the outer surface 532 of the insulating tube 520 at a desired temperature, including a temperature that is safe and suitable for operation of the device 510 in various environments, where the risk of fire or human injury is a concern. In some embodiments, the insulating tube 520 may be formed from multiple layers, such as an inner section 550 and an outer section 554. As such, the inner section 550 may be a rigid section formed of any suitable material, such as ceramic or glass material, such as alumina or quartz, including Inconel or Crofer 22 APU, and composites thereof, and the outer section 554 may be formed form a thermal insulating or heat resistant material, such as a fibrous heat resistant material or insulating material, such as fiber glass. It should be appreciated that in some embodiments of the testing device 510 that only one of the sections 550,554 may be utilized by the insulating tube 520. In still other embodiments of the testing device 510, the insulating tube 520 may not be used entirely.

Positioned within the insulating cavity 540 is a heating tube 570. The heating tube 570 includes a wall 580 having an outer surface 582 and an inner surface 584 that defines therein a heating cavity 590. The heating cavity 590 is terminated by a closed end 612 and an open end or opening 614, and in some embodiments may be elongated. The heating tube 570 may be formed to have a cylindrical shape as shown, as well as any other suitable cross-sectional shape, such as a rectilinear shape, a curvilinear shape, or any combination thereof. The heating cavity 590 is dimensioned to receive at least a portion of the SOFC 511 therein, and as such, may have a cylindrical cross-sectional shape, as shown in FIG. 8, as well as a rectilinear shape, a curvilinear shape or any combination thereof. It should also be appreciated that the outer surface 582 of the heating tube 570 is spaced away from the inner surface 534 of the insulating tube 520 by a gap 591 using any suitable technique. For example, the gap 591 may be maintained through the use of one or more supports or spacers that are operatively coupled between the heating tube 570 and the insulating tube 520. In some embodiments, the supports or spacers may have apertures disposed therethrough to permit the flow of gas material therethrough. Alternatively, the gap may be maintained via the attachment and support of the insulating tube 520 and the heating tube 570 to a connector 600 to be discussed. In some embodiments, the closed end 612 of the heating tube 570 includes one or more heater ports 620 disposed therethrough to permit the flow of an oxidant gas, such as air or oxygen, therethrough. In some embodiments, the heater ports 620 may be positioned substantially opposite to the opening 614 of the heating cavity 590.

The heating cavity 590 is configured to receive at least a portion of the SOFC 511 therein. In order to support the SOFC 511 within the heating cavity 590, one or more supports 650 or spacers may be included. In some embodiments, the supports 650 may position the SOFC 511 within the heating cavity 590 so that the outer surface, or cathode 3, of the SOFC 511 is spaced away from the inner surface 584 of the heating tube 570 by a gap 653. The supports or spacers 650 may include various shapes and dimensions, and in some embodiments, may include apertures therethrough to enable the flow of gas material therethrough. The heating tube 570 may incorporate various heating technologies to generate heat that is imparted to the SOFC 511 that is positioned within the heating cavity 590. Such heating technologies may include but are not limited to convection heating or radiant heating technologies, as well as heating technologies that utilize resistive heating elements.

The connector 600, in some embodiments, is provided to supply electrical power to operate the heating tube 570. For example, the connector 600 may be configured to be connected to a suitable source of power, such as an AC (alternating current) or DC (direct current) power source, which is then supplied to the heating tube 570 that is also electrically attached to the connector 600 via suitable electrical terminals 690. In addition, the connector 600 may include electrical components necessary to convert the power received from the power source into a format that is compatible for use with the heating tube 570. It should be appreciated that the connector 600 may be formed of any suitable material, such as metal or ceramic material for example.

The connector 600 may be removably or permanently attached to the insulating tube 520 and/or the heating tube 570. In addition, the connector 600 when attached to the insulating and heating tubes 520,570, is interfaced with the gap 591 that is between the insulating tube 520 and the heating tube 570 at a point that is proximate to the end 548 of the insulating tube 520 and the closed end 612 of the heating tube 570. Specifically, the connector 600 may include one or more connector ports 694 that are arranged to be in operative fluid communication with the insulator cavity 540 and the heater ports 620 to enable the flow of gas material therethrough. Thus, when the connector 600 is interfaced with the gap 591, the connector ports 694 are placed in fluid communication with the gap 591, as well as with one or more of the heater ports 620, along with the outside environment. In some embodiments, the connector ports 694 may be configured to be directly coupled between the gap 591 and the heater ports 620.

In order to supply fuel gas, such as hydrogen, into the central cavity 5 of the SOFC 511, a fuel tube or supply tube 700 is provided by the testing device 510. The fuel tube 700 may be cylindrical in shape, as shown in FIG. 8, but may be any suitable shape, including a rectilinear shape, a curvilinear shape, or any combination thereof. Furthermore, the fuel tube 700 is shaped and dimensioned to be received within the shape and dimension of the central cavity 5 of the SOFC 511. In some embodiments, the fuel tube 700 is spaced from the inner central surface or electrode 2 defining the heating cavity 5 of the SOFC 511 by a gap 702 using one or more supports or spacers 710 or any other suitable means. The fuel tube 700 also includes a cavity 712 that is terminated at each end by openings 720 and 724. In addition, the fuel tube 700 is configured and/or positioned so that the opening 724 thereof that is inserted in the central cavity 5 of the SOFC 511 is spaced away from the closed end B' of the SOFC 511 by a suitable distance to form a gap to allow any fuel gas delivered out of the opening 724 to escape into the central cavity 5 of the SOFC 511. It should be appreciated that in some embodiments, the fuel tube 700 may be formed of ceramic, glass, or metal, such as alumina, zirconia, quartz, Inconel or Crofer 22 APU, as well as any other suitable material.

As such, with arrangement of the heating tube 570 within the insulating tube 520, and the SOFC 511 within the heating tube 570 several passages are formed in the testing device 510 to facilitate the flow of gas materials. Specifically, the gap 591 formed by the arrangement of the heating tube 570 within the insulating tube 520 creates an oxidant inlet passage 750 therebetween, and the arrangement of the gap 653 between the SOFC 511 and the heating tube 570 forms an oxidant outlet passage 754. The oxidant inlet passage 750 includes openings 760 and 761, which are respectively positioned proximate to the open end A of the SOFC 511, and the connector 600. However, when the connector 600 is attached to the insulating tube 520 and the heating tube 570, the connector port 694 of the connector 600 is placed in fluid communication with the opening 761 of the oxidant inlet passage 750. That is, when the connector 600 is attached, the opening 761 of the oxidant inlet passage 750 is interfaced with the connector ports 694. The oxidant outlet passage 754 includes an opening 762, which is positioned proximate to the open end A of the SOFC 511. The oxidant outlet passage 754 is in operative fluid communication with the heater port 620 that are positioned proximate to the closed end B' of the SOFC 511. Thus, the oxidant inlet passage 750 and the oxidant outlet passage 754 are in operative fluid communication with each other via the connector port 694 and the heater port 620 that function to fluidly couple or join the two passages 750 and 754. Furthermore, in some embodiments, the oxidant inlet passage 750 and the oxidant outlet passage 754 may be concentric with each other. In addition, the oxidant inlet passage 750 and the oxidant outlet passage 754 may take on any suitable cross-sectional shape, such as the cylindrical shape shown in FIG. 8.

In addition, the arrangement of the gap 702 between the fuel tube 700 and the outer electrode or anode 2 of the central cavity 5 of the SOFC 511 forms a fuel outlet passage 790 therebetween that includes an opening 791. Furthermore, in some embodiments, the oxidant inlet passage 750, the oxidant outlet passage 754, and the fuel outlet passage 790 are concentric and/or coaxial with each other. In addition, the fuel outlet passage 790 may take on any suitable cross-sectional shape, such as the cylindrical shape shown in FIG. 8. Moreover, the testing device 510 may be configured so that at least two of the insulating tube 520, the heating tube 570, the SOFC 511 and the fuel tube 700 are co-axial with each other.

Thus, during operation of the testing device 510, the connector 600 is attached to the insulating tube 520 and the heating tube 570. Next, the SOFC 511 is inserted into the heating tube 570 so that the closed end B' of the SOFC 511 is positioned proximate to the closed end 612 of the heating tube 570. In some embodiments, the closed end B' of the SOFC 511 and the closed end 612 of the heating tube 570 may be spaced apart by a gap. Next, the fuel tube 700 is inserted into the central cavity 5 of the SOFC 511 so that the end 724 is spaced from the closed end B' of the SOFC 511. Oxidant gas, such as air or oxygen, is acquired for supply into the heating cavity 590 via two paths. In the first path, oxidant gas is received into the oxidant inlet passage 750 via opening 760, whereupon it passes through the connector port 694, where it is permitted to collect in an area proximate to the heater port 620. The incoming oxidant gas, in addition to being warmed up in the first path, also assists in cooling the sections 550,554 of the insulating tube 520 as it flows through the first path. This oxidant gas is then collected and combined with other oxidant gas that is acquired by a second path that includes the external environment directly adjacent to the heater port 620. The combined oxidant gas is then permitted to enter the heater cavity 590 through the heater port 620. The oxidant gas then interacts with the cathode 3 of the SOFC 511, whereupon any remaining oxidant gas and/or reaction by-products are permitted to exit the heater cavity 590 through the oxidant outlet passage 754 via the opening 762. In addition, fuel gas, such as hydrogen, is delivered into the fuel tube 700, where it exits from the opening 724 and into the central cavity 5 of the SOFC 511. This fuel then interacts with the anode 2 of the SOFC 511, whereupon any remaining fuel gas and/or reaction by-products are permitted to exit the central cavity 5 through the fuel outlet passage 790 via the opening 791. As such, the hot remaining fuel gas and/or react by-products then serve to warm up or pre-heat the incoming fuel gas being delivered to the SOFC 511.

It should be appreciated that during this process, the heating tube 570 is operated to heat the SOFC 511 to a suitable temperature for operation. In some embodiments, the heating tube 570 and the computing device 94 may be placed in operative communication with each other, such as by a wired or wireless communication interface, so that the heating tube 570 can be controlled to adjust the magnitude of the heat output therefrom based on the temperature detected by sensor 92 that is positioned within the heating cavity 590 and/or insulting cavity 540, as previously discussed with regard to the other embodiments.

It should be appreciated that while the discussion of the various embodiments of the testing device 510 are presented for use with the SOFC 511, whereby oxidant gas is fed to the SOFC 511 via the oxidant inlet passage 760, the heater port 620 and the oxidant outlet passage 762; and fuel gas is supplied to the SOFC 511 via the fuel tube 700, the testing device 510 may carry any desired material through such structures. For example, in the case where alternative SOFC designs are utilized, the oxidant inlet passage 760, the connector port 694, the heater port 620 and the oxidant outlet passage 762 may carry fuel gas, while the fuel tube 700 may carry oxidant gas.

Figure 9:
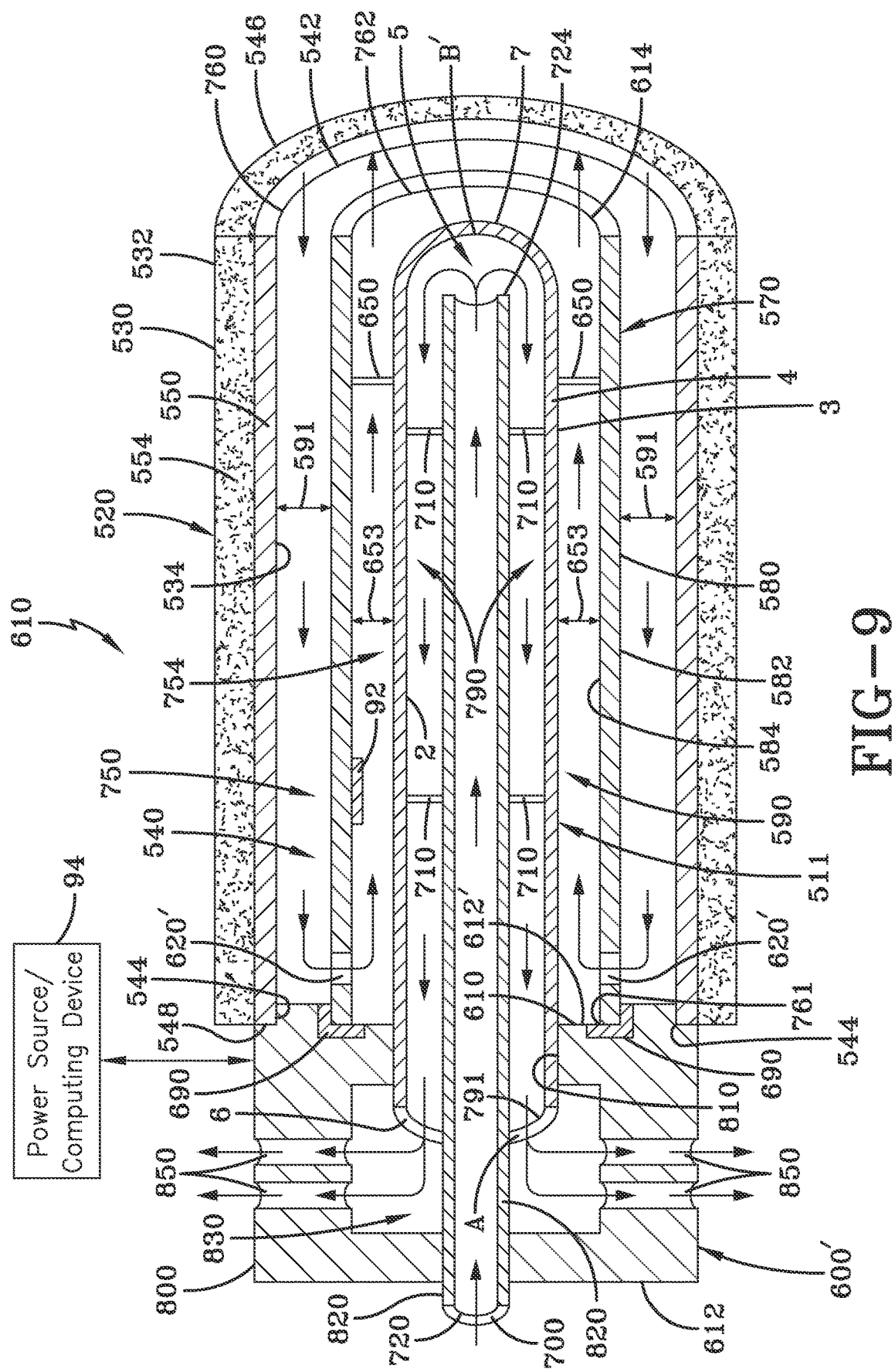
FIG. 9 is a cross-sectional view of still another embodiment of the universal solid oxide fuel cell testing device in accordance with the concepts and disclosures presented herein.

Another embodiment of the tubular SOFC testing device referred to by numeral 610 is shown in FIG. 9. The testing device 610 is configured for use with a tubular SOFC, such as tubular SOFC 511, as previously discussed with regard to FIG. 8.

The testing device 610 includes the insulating tube 520, the heating tube 570, and the fuel tube 700 as previously discussed with regard to testing device 510. However, the heating tube 570 of the testing device 610 is modified for use in the device 610 such that the closed end 612 of the heating tube 570 is replaced with an opening 612' that is in operative fluid communication with the heating cavity 590. In addition, one or more heater ports 620' still included with the testing device 610, such that they are disposed through the heating tube 570. For example, in some embodiments, the one or more heater ports 620 may be positioned at a point proximate to the end 612' of the heating tube 570. Additionally, the heater ports 620' may be formed by a gap between the end of the heating tube 570 and the connector 600' to be discussed, which is attached to the device 610. That is, the connector 600' of the testing device 610 is a modified connector 600, however, the connector 600' includes the structural and operational features of connector 600 except where noted in the discussion below.

As previously discussed, the outer surface 582 of the heating tube 570 is spaced away from the inner surface 534 of the insulating tube 520 by the gap 591. It should also be appreciated that in some embodiments, the gap 591 may be maintained by attachment and support of the insulating tube 520 and the heating tube 570 to the connector 600' to be discussed.

The SOFC 511 is positioned within the heating cavity 590, such that the closed end B' of the SOFC 511 is proximate to the opening 614 of the heating tube 570, and the open end A of the SOFC is proximate to opening 612' of the heating tube 570. In order to support the SOFC 511 within the heating cavity 590, one or more supports 650 or spacers may be included. In some embodiments, the supports 650 may position the SOFC 511 within the heating cavity 590 so that the outer surface, or cathode 3, of the SOFC 511 is spaced away from the inner surface 584 of the heating tube 570 by the gap 653.

In order to supply fuel gas, such as hydrogen, into the central cavity 5 of the SOFC 511, the fuel tube or supply tube 700 is provided by the testing device 610, as previously discussed. Furthermore, the fuel tube 700 is shaped and dimensioned to be received within the shape and dimension of the central cavity 5 of the SOFC 511. In some embodiments, the fuel tube 700 is spaced from the central surface or anode 2 defining the heating cavity 5 of the SOFC 511 by the gap 702 using one or more supports or spacers 710 or any other suitable means. The fuel tube 700 defines the cavity 712 that is terminated at each end by openings 720 and 724. In addition, the fuel tube 700 is configured and/or positioned so that the opening 724 of the fuel tube 700 that is inserted in the central cavity 5 of the SOFC 511 is spaced away from the closed end B' of the SOFC 511 by a suitable distance to allow any fuel gas delivered out of the opening 724 to escape into the central cavity 5 of the SOFC 511.

The connector 600', in some embodiments, is provided to supply electrical power to operate the heating tube 570. The connector 600' is configured to be connected to a suitable source of power, such as an AC (alternating current) or DC (direct current) power source, which is supplied to the heating tube 570 that is also electrically attached to the connector 600' via suitable electrical terminals 690. In some embodiments, the heating tube 570 and/or insulating tube 520 may be removably or permanently attached to the connector 600'. In addition, the connector 600' may include any necessary electrical components to convert the power received from the power source into a format that is compatible for use with the heating tube 570. In some embodiments, the connector 600' may be used to close the end of the insulating tube 520 and the heating tube 570. That is, when the connector 600' is attached to the insulating and heating tubes 520 and 570, it blocks or closes-off the gaps 591 and 653 that are between the insulating tube 520 and the heating tube 570 at a point that is proximate to the ends 548 and 612' of the insulating tube 520 and the heating tube 570 respectively.

The connector 600' also includes a body 800 that is formed of any suitable material, such as metal or ceramic material for example. The body 800 includes a fuel cell port 810 and a fuel tube port 820, which fluidly communicate with a connector cavity 830. The fuel cell port 810 is in fluid communication with the heating cavity 590, and in some embodiments has a diameter that is smaller than the diameter of the heating cavity 590, this allows the formation of the gap 653 between the SOFC 511 and the heating tube 570. It should be appreciated that in some embodiments, the fuel cell port 810 and the fuel tube port 820 are axially aligned with one another. The fuel cell port 810 is dimensioned to receive the SOFC 511 therethrough so that the outer surface, or cathode 3, of the SOFC 511 is in sealed arrangement with the fuel cell port 810. In addition, the fuel tube port 820 is dimensioned to receive the fuel tube or supply tube 700 therethrough, and in some embodiments so that the fuel tube 700 is in sealed arrangement with the fuel tube port 820. Such sealed arrangement of the SOFC 511 and fuel tube 700 with the connector 600' may be achieved using any suitable sealing means, including but not limited to friction fit, O-ring, mastic, and the like. As such, when the SOFC 511 is installed in the testing device 610, the SOFC 511 is arranged with respect to the fuel cell port 810 so that the open end A of the SOFC 511 is in fluid communication with the connector cavity 830. In addition, the fuel tube 700 is permitted to pass through the fuel tube port 820 and the connector cavity 830 for receipt into the central cavity 5 of the SOFC 511 being tested. The connector 600' also includes one or more exhaust ports 850 that are operative fluid communication with the connector cavity 830. It should be appreciated that the connector 600' may be attached to the insulating tube 520 and/or the heating tube 530 using any suitable means of fixation, such as friction-fit, threaded-fit, and the like.

As such, with arrangement of the heating tube 570 within the insulating tube 520, and the SOFC 511 within the heating tube 570 various passages are formed in the testing device 60 to facilitate the flow of gas materials. Specifically, the arrangement of the heating tube 570 within the insulating tube 520 and the attachment of the connector 600 thereto forms the oxidant inlet passage 750 is formed by the gap 591 therebetween, and the arrangement of the SOFC 511 within the heating tube 570 forms the oxidant outlet passage 754 defined by the gap 653 therebetween. The oxidant inlet passage 750 is terminated by respective openings 760 and 761, which are respectively positioned proximate to the open end A of the SOFC 511 the connector 600. In addition, the oxidant outlet passage 754 includes an opening 762, which is positioned proximate to the open end A of the SOFC 511. Thus, when the connector 600' is attached to the testing device 610, the opening 761 of the oxidant inlet passage 750 is closed or blocked off. As such, the oxidant inlet passage 750 and the oxidant outlet passage 754 are in fluid communication with each other through one or more heater ports 620 disposed through the wall of the heater tube 570. Furthermore, in some embodiments, the oxidant inlet passage 750 and the oxidant outlet passage 754 are concentric with each other. In addition, the oxidant inlet passage 750 and the oxidant outlet passage 754 may take on any suitable shape, such as the cylindrical shape shown in FIG. 8.

In addition, the positioning of the fuel tube 700 within the central cavity 5 of the SOFC 511 forms the fuel outlet passage 790 therebetween. Furthermore, in some embodiments, the oxidant inlet passage 750, the oxidant outlet passage 754, and the fuel outlet passage 790 are concentric with each other. In addition, the fuel outlet passage 790 may take on any suitable shape, such as the cylindrical shape shown in FIG. 8.

During operation of the testing device 610, the connector 600' is attached to the insulating tube 520 and the heating tube 570, as shown in FIG. 9. Next, the SOFC 511 is inserted into the heating tube 570 so that the closed end B' of the SOFC 511 is positioned proximate to the opened end 614 of the heating tube 570. In addition, the opened end, A, of the SOFC 511 is positioned in operative communication with the connector cavity 830 of the connector 600'. The fuel tube 700 is then inserted through the fuel tube port 820 of the connector 600' and into central cavity 5 of the SOFC 511. Oxidant gas, such as air or oxygen, is then supplied into the oxidant inlet channel 750 via the opening 760, which passes through the heater port 620 before being received in the oxidant outlet passage 754. Once received in the oxidant outlet passage 754, the oxidant is permitted to interact with the cathode 3 of the SOFC 511, whereupon any reaction by-products are exhausted from the outlet passage 754 via the opening 762. In addition, fuel gas, such as hydrogen, is delivered into the fuel tube 700, where it is delivered out of the end 724 thereof and into the fuel outlet passage 790 that is partially includes the central cavity 5 of the SOFC 511. This fuel is then permitted to interact with the anode 2 of the SOFC 511, whereupon any reaction by-products are permitted to exit the fuel outlet passage 790 via opening 791 and into the connector cavity 830, before being exhausted therefrom through the exhaust ports 850.

During this process, the heating tube 570 is controlled, such as by computing device 94, as previously discussed, to heat the SOFC 511 to a suitable temperature for operation. That is, the heating tube 570 and the computing device 94 may be placed in operative communication with each other, such as by a wired or wireless communication interface, so that the heating tube can be controlled to adjust the magnitude of the heat output thereby based on the temperature detected by the sensor 92 that is positioned within the heating cavity 590 or insulating cavity 540.

It should be appreciated that while the discussion of the various embodiments of the testing device 610 are presented for use with the SOFC 511, whereby oxidant gas is fed to the SOFC 511 via the oxidant inlet passage 760, the heater port 620 and the oxidant outlet passage 762; and fuel gas is supplied to the SOFC 511 via the fuel tube 700, the testing device 610 may carry any desired material through such structures. For example, in the case where alternative SOFC designs are utilized, the oxidant inlet passage 760, the heater port 620 and the oxidant outlet passage 762 may carry fuel gas, while the fuel tube 700 may carry oxidant gas.

Figure 10:
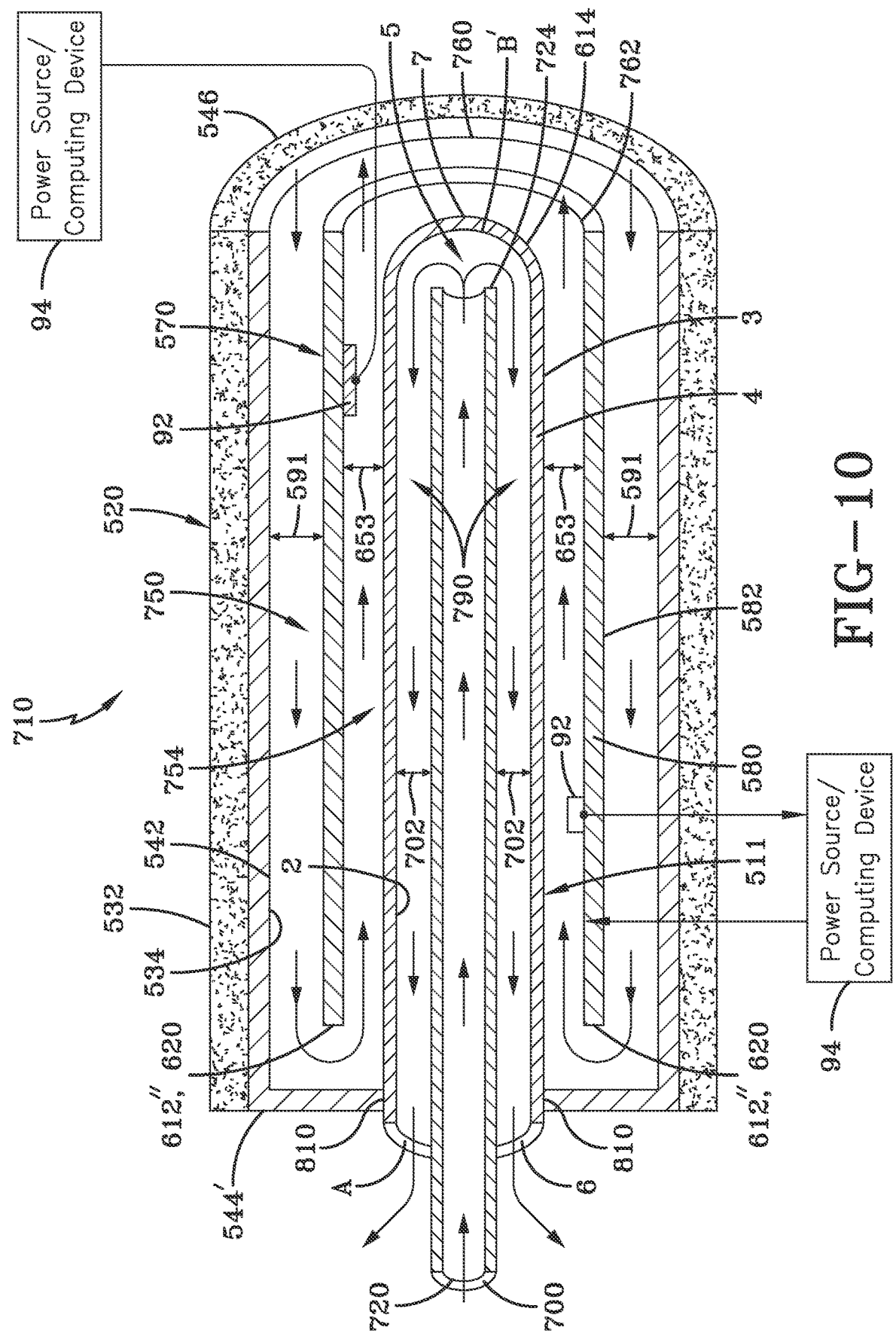
FIG. 10 is a cross-sectional view of yet another embodiment of the universal solid oxide fuel cell testing device in accordance with the concepts and disclosures presented herein.

Another embodiment of the tubular SOFC testing device referred to by numeral 710 is shown in FIG. 10. The testing device 710 is configured for use with a tubular SOFC, such as tubular SOFC 511, as previously discussed. Specifically, the testing device 710 is structurally and functionally equivalent to that of testing device 610 but is modified for use without the connector 600'. As such, the testing device 710 provides the insulator tube 570, as provided in embodiments of the device 510 and 610 but is configured such that opening 544 is a closed end or section 544". The end section 544" may be formed from any suitable material, such as the material used to from the heating tube 570 previously discussed. In addition, fuel cell port 810 is disposed in the end section 900. The fuel cell port 810 is configured to receive the SOFC 511 therethrough so that the SOFC 511 is permitted to be received within the heating cavity 590 of the heating tube 570, while allowing the open end A of the SOFC 511 to remain outside of the heating cavity 590 in communication with the outside environment. However, it should be appreciated that the open end, A, of the SOFC 511 may be placed in operative communication with any desired gas exhaust or ventilation device. It should also be appreciated that the fuel cell port 810 is dimensioned to receive the SOFC 511 therethrough so that the outer surface or electrode 3 of the SOFC 511 is in sealed arrangement with the fuel cell port 810.

In addition, the opening 612" of the heating tube 570 is spaced from the closed end section 544" to form the heater port 620. However, in other embodiments the opening 612" of the heating tube 570 may be closed off by the closed end section 544', such that the heater port 620 may be disposed through the wall 580 of the heating tube 570.

As such, with arrangement of the heating tube 570 within the insulating tube 520, and the SOFC 511 within the heating tube 570 various passages are formed in the testing device 710 to facilitate the flow of gas materials. Specifically, the oxidant inlet passage 750 is formed by the gap 591 therebetween, and with the arrangement of the SOFC 511 within the heating tube 570 the oxidant outlet passage 754 is formed by the gap 653 therebetween. The oxidant inlet passage 750 includes the opening 760, which is positioned proximate to the closed end B' of the SOFC 511. In addition, the oxidant outlet passage 754 includes the opening 762, which is positioned proximate to the closed end B' of the SOFC 511. The oxidant inlet passage 750 and the oxidant outlet passage 754 are in fluid communication with each other through one or more heater ports 620 that are disposed through the wall of the heater tube 570. Furthermore, in some embodiments, the oxidant inlet passage 750 and the oxidant outlet passage 754 are concentric with each other. In addition, the oxidant inlet passage 750 and the oxidant outlet passage 754 may take on any suitable shape, such as the cylindrical shape shown in FIG. 10.

In addition, the positioning of the fuel tube 700 within the central cavity 5 of the SOFC 511 forms the fuel outlet passage 790 therebetween. Furthermore, in some embodiments, the oxidant inlet passage 750, the oxidant outlet passage 754, and the fuel outlet passage 790 are concentric with each other. In addition, the fuel outlet passage 790 may take on any suitable shape, such as the cylindrical shape shown in FIG. 10.

In some embodiments, the heating tube 570 and the computing device 94 may be placed in operative communication with each other, such as by a wired or wireless communication interface, so that the heating tube 570 can be controlled to adjust the magnitude of heat that is output by the heating tube 570 based on the temperature detected by sensor 92 that is positioned within the heating cavity 590 and/or insulting cavity 540.

During operation of the testing device 710, as shown in FIG. 10, the SOFC 511 is inserted through the fuel cell port 810 of the closed end 900 of the heating tube 570 and into the heating cavity 590 so that the closed end, B', of the SOFC 511 is positioned proximate to the opening 762 of the heating tube 570. In addition, the opened end A of the SOFC 511 is positioned to extend outside of the closed end 544' of the insulating cavity 520 so that it is in fluid communication with the outside environment. The fuel tube or supply tube 700 is then inserted into central cavity 5 of the SOFC 511. Oxidant gas, such as air or oxygen, is then supplied into the oxidant inlet channel 750 via opening 760, which passes through the heater port 620 before being received in the oxidant outlet channel 754. Once received in the oxidant outlet channel 754, the oxidant is permitted to interact with the cathode 3 of the SOFC 511, whereupon any remaining oxidant and/or reaction by-products are exhausted from the outlet channel 754 via the opening 760. In addition, fuel gas, such as hydrogen, is delivered into the fuel tube 700, where it is delivered out of the end 724 thereof and into the fuel outlet passage 790. This fuel is then permitted to interact with the anode 2 of the SOFC 511, whereupon any remaining fuel gas and/or reaction by-products are permitted to exit the fuel outlet passage 790 via the opening 791 before being exhausted. During this process, the heating tube 570 is controlled, such as by computing device 94, as previously discussed, to heat the SOFC 511 to a suitable temperature for operation. That is, the heating tube 570 and the computing device 94 may be placed in operative communication with each other, such as by a wired or wireless communication interface, so that the heating tube can be controlled to adjust the magnitude of the heat output by the heating tube 570 base on the temperature detected by the sensor 92 that is positioned within the heating cavity 590 or insulating cavity 540.

It should be appreciated that while the discussion of the various embodiments of the testing device 710 are presented for use with the SOFC 511, whereby oxidant gas is fed to the SOFC 511 via the oxidant inlet passage 760, the heater port 620 and the oxidant outlet passage 762; and whereby fuel gas is supplied to the SOFC 511 via the fuel tube 700, the testing device 610 may carry any desired material through such structures. For example, in the case where alternative SOFC designs are utilized, the oxidant inlet passage 750, the heater port 620 and the oxidant outlet passage 754 may carry fuel gas, while the fuel tube 700 may carry oxidant gas.

Figure 11:
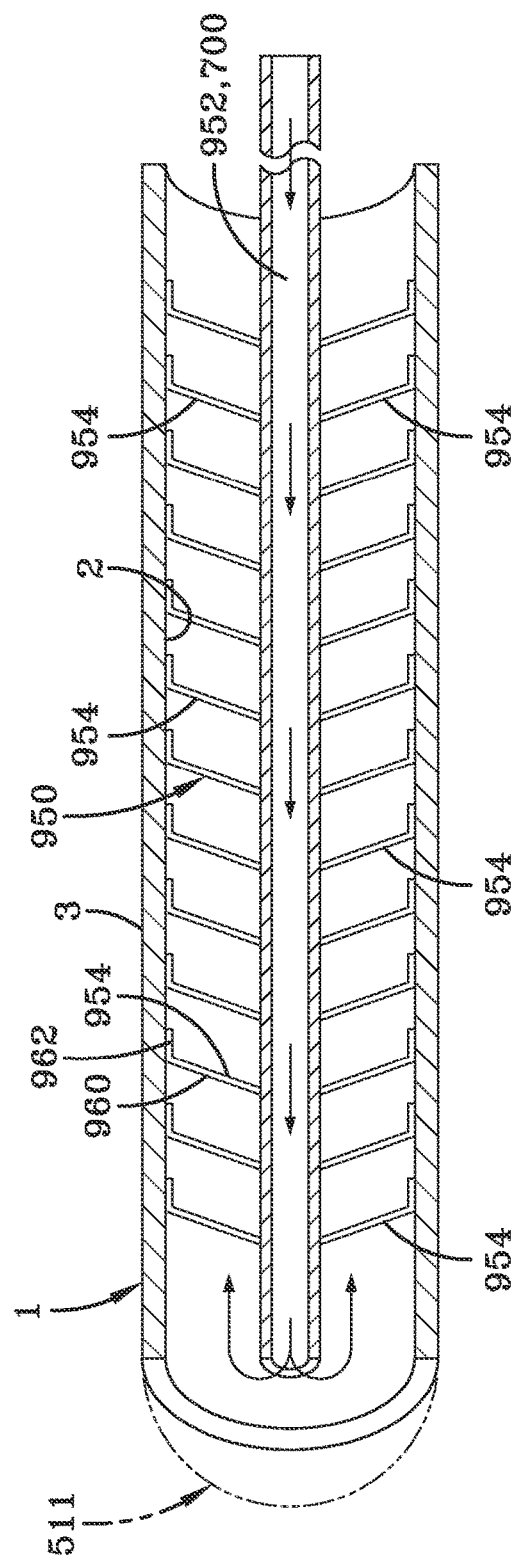
FIG. 11 is a perspective view of a current collector device in accordance with the concepts and disclosures presented herein.

In another aspect, the various testing device embodiments discussed herein may utilize a current collector 950 for testing the SOFCs 1 and 511, as shown in FIG. 11. The current collector 950 is configured to be received within the central cavity 5 of the SOFCs 1,511 so as to be placed in electrical contact with the electrode 2 thereof. In particular, the current collector 950 includes an electrically conductive member 952, which may be in the form of a solid or hollow section, such as a rod or tube for example, and which may be in some embodiments configured to have an elongated profile. It should be appreciated that in some embodiments the conductive member 952 may comprise the supply tube 700 previously discussed. Electrically coupled to the conductive member 952 is a plurality of electrically conductive ribs 954. In some embodiments, the ribs 954 may be flexible, so as to allow a lengthwise surface of the ribs 954 to electrically contact the electrode 2 when the current collector 950 is placed in the cavity 5 of the SOFC 1,511. In some embodiments, the conductive ribs 954 and conductive member 952 may comprise metal or any suitable material. In some embodiments, the conductive ribs 954 may comprise flexible metal wire filaments or projections. It some embodiments the ribs 954 may have a preformed shape, such as a curvilinear shape, a rectilinear shape, or any combination thereof.

In some embodiments, the ribs 954 may be configured to extend from the conductive member 952 at an angle, such as an oblique angle. As such, the angle of the ribs 954 relative to the conductive member 954 allows the ribs, in some cases, to compressively or springly engage or contact the electrode 2 of the SOFC 1,511.

Furthermore, in some embodiments, the ribs 954 may comprise a first leg 960 that extends from the conductive member 952 and a second leg 962 that extends from the first leg 960 at an angle, such as an oblique angle. As such, the second leg 962 may be configured so as to be substantially parallel to the longitudinal axis of the SOFC 1,511, when the conductive member 952 is inserted in the central cavity 5 of the SOFC 1,511. Furthermore, the conductive member 952 may be dimensioned so that it extends beyond, or out of, one of the openings A,B of the SOFCs 1,511. In some embodiments, the conductive member 952 may also extend through the fuel port 400 of testing device 310.

Figure 12:
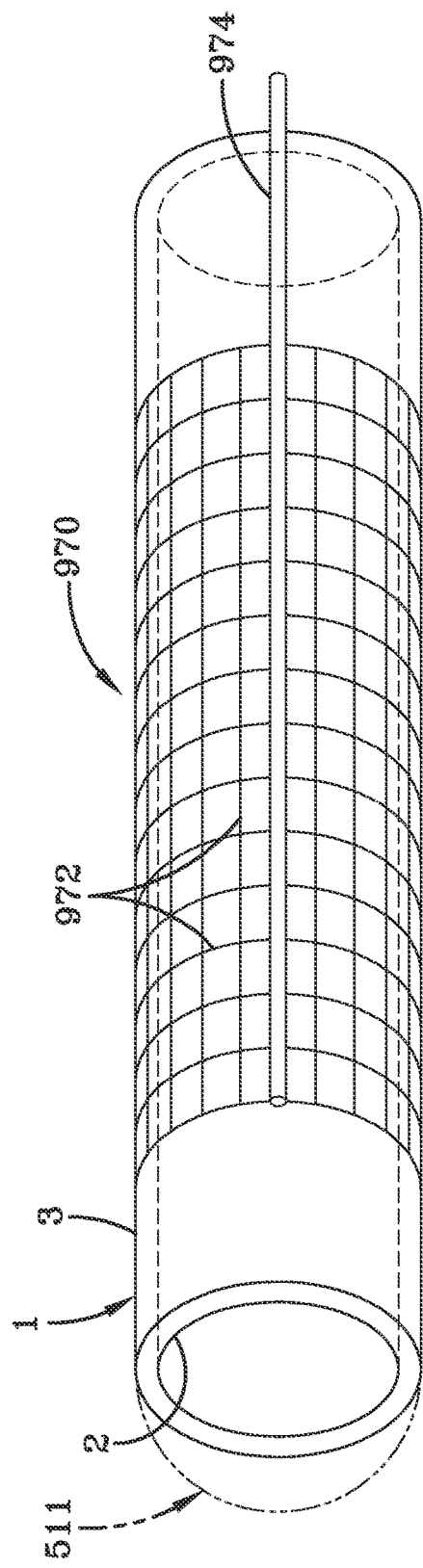
FIG. 12 is a perspective view of an alternative current collector device in accordance with the concepts and disclosures presented herein.

Another current collector 970 is configured to be placed in electrical contact with the electrode 3 of the SOFCs 1,511 is shown in FIG. 12. The current collector 970 includes an electrically conductive mesh material 972 that is configured to be conformable, so as to be at least partially wrapped around the electrode 3 of the SOFCs 1,511 so as to be in electrical contact therewith. That is, the mesh 972 may not be fully wrapped around the electrode 3, so long as some portion of the mesh 972 is in electrical contact with the electrode 3. Electrically coupled to the conductive mesh 972 is an electrically conductive member 974. In some embodiments, the conductive member 974 may comprise a solid or hollow section, such as a rod or tube for example, and which may be in some embodiments configured to have an elongated profile. For example, the conductive member 974 may be attached to a surface of the mesh 972 that is opposite to a surface of the mesh 972 that is in electrical contact with the electrode 3. It should be appreciated that the conductive member 974 may be configured to extend beyond one or more of the end 6,7 of the SOFC 1,511. It should be appreciated that the mesh 972 and member 974 may comprise any suitable conductive material, such as metal.

In some embodiments, the current collector 970 may in include a locking device as part of the mesh 972 that enables the loose ends thereof to be coupled together to retain the mesh 972 in electrical contact with the electrode 3. The locking device may comprise interlocking members, such as interlocking hooks that are configured so that when they are mated together secure the loose ends of the mesh 972 together.

It should be appreciated that each of the embodiments of the tubular SOFC testing device, and their individual components thereof, may be provided as a kit. In addition, to the testing device, the kit may also include one or more of: a tubular testing furnace, a D.C. (direct current) electric load for electrical coupling to the anode and cathode of the SOFC, one or more temperature sensors, various other sensors, and various associated accessories. As previously discussed, the embodiments disclosed herein also contemplate a method for controlling the temperature of the SOFC that is within the testing device by controlling the operation of the furnace using a thermocouple or temperature sensor(s) 92 that is placed within the testing device of the embodiments disclosed herein.

Thus, the testing devices of the various embodiments disclosed herein are provided to precisely mount and isolate a tubular SOFC within a heating device, such as the tubular testing furnace 175 and allows accurate control of the temperature of the atmosphere that immediately surrounds the SOFC 1,511 more effectively than is able to be achieved by current testing devices and methods. The temperature of the heating device 175 is identified by directly probing the interior cavity of the housing of the testing device with a thermocouple or any other temperature sensing device, such as a sensor 92. The testing device also allows easy and precise placement of the tubular SOFC 1,511 into a typical tubular furnace, and also allows the SOFC 1,511 to be adequately supported therein. The testing device also supports the use of various electrical contacts utilized to connect the tubular SOFC 1,511 to an external electric load, such as a D.C. (direct current) electrical device, including an electric motor for example. In addition, the testing device also allows the oxidant gas, such as air or oxygen, flowing around the cathode of the SOFC 1,511 to be controlled, as compared to current testing methods and devices that do not incorporate the use of a testing device.

As previously discussed, the testing device of the various embodiments may be configured as part of a test kit, which includes a testing furnace, an electronic load, such as electric motor or the like. In addition, as previously discussed, optional accessories may be used to connect the tubular SOFC 1,511 to gas supply lines, and electrical contacts may be used to connect the SOFC 1 to a D.C. (direct current) output and/or data port in communication with the computing device 94.

As such, the embodiments of the testing device disclosed herein allows for fast setup, flexibility with different SOFC sizes, allows the SOFC to be easily changed out of the testing device, allows improved testing repeatability, and is cost effective.

Therefore, it can be seen that the objects of the embodiments have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the invention, reference should be made to the following claims.

What is claimed is:

1. A current collector for a tubular solid-oxide fuel cell (SOFC) having an outer electrode and a central cavity that is defined by a central electrode, the current collector comprising:
   an electrically conductive member; and
   a plurality of electrically conductive and flexible ribs electrically coupled to, and extending from, said member, said ribs configured to be in electrical contact with said central electrode when said member is at least partially inserted into said central cavity,
   wherein each of said ribs comprise:
   a first leg that extends from said member, wherein said first leg extends from said member at an oblique angle; and
   a second leg that extends from said first leg at an angle, such that said second leg is substantially parallel to a longitudinal axis of the central cavity.

2. The current collector of claim 1, wherein said ribs radially extend from said member.

3. The current collector of claim 1, wherein said ribs are configured to compressively contact the central electrode.

4. The current collector of claim 1, wherein said member is solid.

5. The current collector of claim 1, wherein said member is a tube configured to supply a gas to the central cavity.

6. The current collector of claim 1, wherein said ribs comprise metal filaments.

7. The current collector of claim 1, wherein said member is a cylindrical tube configured to supply a gas to the central cavity.

8. The current collector of claim 1, wherein said member has a continuous outer diameter.

* * * * *